US012188433B2

(12) United States Patent
Hussain et al.

(10) Patent No.: US 12,188,433 B2
(45) Date of Patent: Jan. 7, 2025

(54) THERMAL MANAGEMENT SYSTEM FOR A GAS TURBINE ENGINE

(71) Applicant: ROLLS-ROYCE plc, London (GB)

(72) Inventors: Zahid M Hussain, Derby (GB); Vasileios Kyritsis, Derby (GB)

(73) Assignee: ROLLS-ROYCE plc, London (GB)

( * ) Notice: Subject to any disclaimer, the term of this patent is extended or adjusted under 35 U.S.C. 154(b) by 0 days.

(21) Appl. No.: 18/539,813

(22) Filed: Dec. 14, 2023

(65) Prior Publication Data

US 2024/0200495 A1 Jun. 20, 2024

(30) Foreign Application Priority Data

Dec. 16, 2022 (GR) .............................. 20220101044

(51) Int. Cl.
*F02C 7/18* (2006.01)
*F02K 3/115* (2006.01)

(52) U.S. Cl.
CPC ............... *F02K 3/115* (2013.01); *F02C 7/18* (2013.01); *F05D 2240/14* (2013.01); *F05D 2260/213* (2013.01); *F05D 2260/31* (2013.01); *F05D 2260/606* (2013.01)

(58) Field of Classification Search
CPC .............. F02C 7/14; F02C 7/18; F02K 3/115
See application file for complete search history.

(56) References Cited

U.S. PATENT DOCUMENTS 5,269,135 A 12/1993 Vermejan et al.
6,134,880 A * 10/2000 Yoshinaka ............ F28D 9/0018
60/806
2008/0028763 A1 2/2008 Schwarz et al.
2009/0016890 A1 * 1/2009 Douguet ............... F01D 5/3092
416/219 R
2013/0104559 A1 5/2013 Papa et al.
2016/0222886 A1 8/2016 Riehle et al.
2016/0231068 A1 8/2016 Schmitz et al.
(Continued)

FOREIGN PATENT DOCUMENTS

EP 3 130 539 A1 2/2017
EP 3 483 414 A1 5/2019

OTHER PUBLICATIONS

May 13, 2024 Extended European Search Report issued in European Patent Application No. 23212942.9.
(Continued)

*Primary Examiner* — Katheryn A Malatek
(74) *Attorney, Agent, or Firm* — Oliff PLC

(57) ABSTRACT

A thermal management system for a gas turbine engine includes a plurality of inlet and outlet vanes extending from a bypass inner wall towards an outer cowl, a plurality of first removable shims, a plurality of second removable shims, and a third removable shim. Each first removable shim extends between and engages the outer cowl and a corresponding inlet vane. Each second removable shim extends between and engages the outer cowl and a corresponding outlet vane. The third removable shim extends between and engages a heat exchanger and the outer cowl. Each of the plurality of first removable shims, each of the plurality of second removable shims, and the third removable shim is removable for positionally adjusting the outer cowl relative to the bypass inner wall.

17 Claims, 10 Drawing Sheets

(56) References Cited

U.S. PATENT DOCUMENTS

| | | |
|---|---|---|
| 2016/0369746 A1 | 12/2016 | Armstrong et al. |
| 2017/0009657 A1 | 1/2017 | Schwarz et al. |
| 2017/0058834 A1 | 3/2017 | Vaisman et al. |
| 2017/0159490 A1* | 6/2017 | Sennoun .................. F02K 3/06 |
| 2020/0362759 A1 | 11/2020 | Roberge |
| 2021/0071581 A1 | 3/2021 | Sodaro et al. |
| 2022/0282670 A1* | 9/2022 | Niergarth ............. F28D 1/0471 |

OTHER PUBLICATIONS

Jul. 31, 2023 Combined Search and Examination Report issued in British Patent Application No. 2301410.3.

* cited by examiner

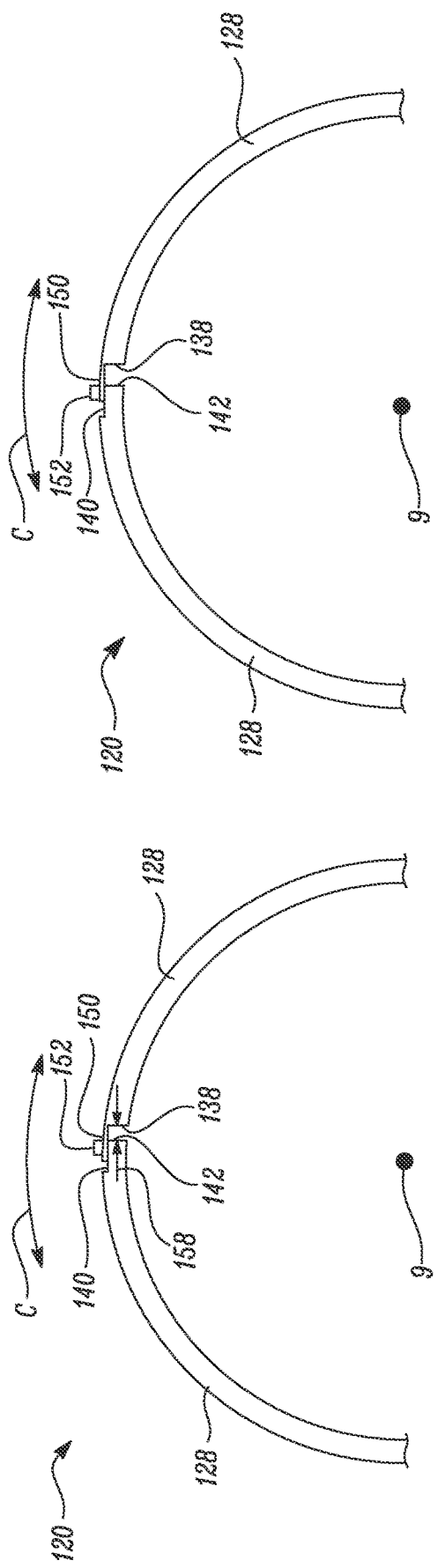
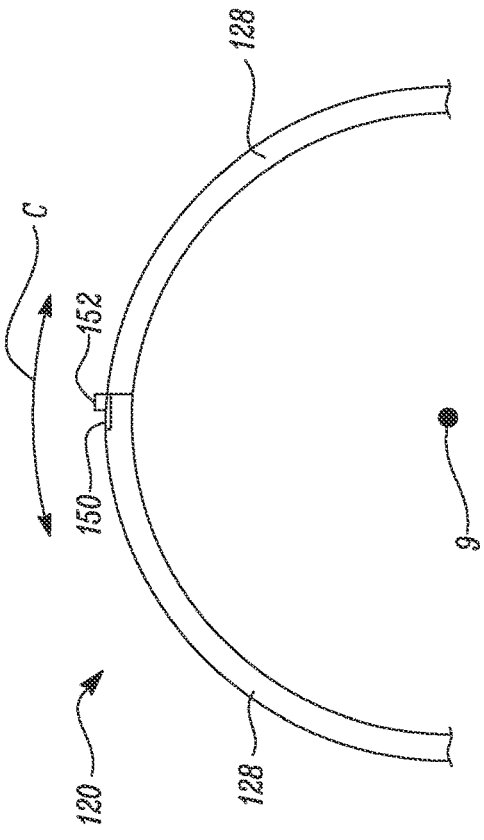
FIG. 9A
FIG. 9B
FIG. 9C

THERMAL MANAGEMENT SYSTEM FOR A GAS TURBINE ENGINE

CROSS-REFERENCE TO RELATED APPLICATIONS

This specification is based upon and claims the benefit of priority from Greek patent application number GR 20220101044 filed on Dec. 16, 2022, the entire contents of which is incorporated herein by reference.

BACKGROUND

1. Field of the Disclosure

The present disclosure generally relates to a thermal management system for a gas turbine engine and a method for thermal management of the gas turbine engine.

2. Description of the Related Art

Thermal management systems for gas turbine engines (and associated equipment) may manage heat generated and rejected by the gas turbine engine during operation to ensure that all engine fluids within the gas turbine engine are maintained at safe and effective temperatures at all times. Heat rejection requirements for the gas turbine engine may depend on operational conditions as well as design assumptions, which are characterised by uncertainties during operation of the gas turbine engine. Such uncertainties may vary throughout a design process of the gas turbine engine. Further, the operational conditions may change during a service life of the gas turbine engine, either due to environmental conditions, degradation, and/or deviation in an operational scope (e.g., use of sustainable aviation fuel). As a consequence, actual heat rejection may be different from a required demand, leading to incompatibility and/or operation of the gas turbine engine beyond its intended envelope, or even restricted operation.

Prior solutions have historically introduced safety margins through design factors. These safety margins are derived based on a range of uncertainties which may not be explicitly quantified, resulting in pessimistically over-sized design factors. Such design factors may typically result in a system (i.e., a gas turbine engine design) that is over-designed to account for all combinations of known and unknown uncertainties. This approach may typically result in over-sizing and an increased weight of the system. This may be accompanied by a performance penalty across the gas turbine engine, including non-optimal specific fuel consumption (SFC), which must be accepted over a service life of the gas turbine engine. The oversized system may be required to operate at part-load which may further degrade an efficiency of the system. Adjustment in a system-level performance may be realised by alternative means, e.g., coolant-flow restrictors of a coolant-air heat exchanger system, which may further add to extra weight, complexity, and component count.

In certain instances, the unknown uncertainties may still dominate, resulting in a system that is under-sized for a required duty cycle. A possible reason for this under-sizing may be an extension in an operational envelope of the gas turbine engine or the associated equipment (e.g., a gearbox, an auxiliary system, such as power electronics, etc.). Such requirements may appear later during an engine design process and/or in-service after the engine design process is complete.

An approach to minimize the aforementioned consequences of requirement uncertainty may lead to introduction of active control systems which may manage the system within limits. However, the active control systems may in turn introduce additional failure scenarios and potential redundancy through duplication to ensure operational safety.

SUMMARY OF THE DISCLOSURE

According to a first aspect, there is provided a thermal management system for a gas turbine engine having a principal rotational axis, an engine core, and a nacelle. The thermal management system includes a bypass inner wall circumferentially surrounding the engine core around the principal rotational axis and extending along the principal rotational axis. The bypass inner wall is radially disposed between the engine core and the nacelle relative to the principal rotational axis, such that a main bypass duct is defined between the bypass inner wall and the nacelle. The thermal management system further includes an outer cowl circumferentially surrounding and radially spaced apart from the bypass inner wall relative to the principal rotational axis. The outer cowl extends along the principal rotational axis between an inlet end and an outlet end. The outer cowl is disposed within the main bypass duct. The thermal management system further includes a plurality of inlet vanes extending from the bypass inner wall towards the outer cowl and disposed proximal to the inlet end of the outer cowl. The plurality of inlet vanes are circumferentially spaced apart from each other relative to the principal rotational axis. The thermal management system further includes a plurality of outlet vanes extending from the bypass inner wall towards the outer cowl and disposed proximal to the outlet end of the outer cowl. The plurality of outlet vanes are circumferentially spaced apart from each other relative to the principal rotational axis. The thermal management system further includes a heat exchanger extending from the bypass inner wall towards the outer cowl and axially disposed between the inlet end and the outlet end relative to the principal rotational axis. The thermal management system further includes a plurality of first removable shims corresponding to the plurality of inlet vanes. Each first removable shim from the plurality of first removable shims extends between and engages the outer cowl and a corresponding inlet vane from the plurality of inlet vanes. The thermal management system further includes a plurality of second removable shims corresponding to the plurality of outlet vanes. Each second removable shim from the plurality of second removable shims extends between and engages the outer cowl and a corresponding outlet vane from the plurality of outlet vanes. The thermal management system further includes a third removable shim extending between and engaging the heat exchanger and the outer cowl. The third removable shim circumferentially extends around the principal rotational axis. For positionally adjusting the outer cowl relative to the bypass inner wall: each of the plurality of first removable shims is removable from between the corresponding inlet vane and the outer cowl; each of the plurality of second removable shims is removable from between the corresponding outlet vane and the outer cowl; and the third removable shim is removable from between the heat exchanger and the outer cowl.

Use of the plurality of first removable shims, the plurality of second removable shims, and the third removable shim may allow the outer cowl to be positionally adjusted relative to the bypass inner wall. Thus, the plurality of first removable shims, the plurality of second removable shims, and the third removable shim may allow the outer cowl to be moved in an axial and/or a radial direction relative to the principal rotational axis, thereby increasing or decreasing geometric areas at the inlet end and the outlet end of the outer cowl. This may increase or decrease air flowing through the heat exchanger, thereby allowing a performance of the thermal management system to be adjusted based on updated operational requirements of the gas turbine engine after a design of the gas turbine engine has been fixed.

The plurality of first removable shims and the plurality of second removable shims may be located at discrete circumferential positions around the principal rotational axis, thereby allowing the air flow through the heat exchanger without significant resistance to the flow of air. Further, the third removable shim may be removable such that the heat exchanger remains engaged with the outer cowl as the outer cowl is adjusted relative to the bypass inner wall. In some extreme circumstances, the third removable shim may be used to shroud a portion of the heat exchanger, thereby further varying the performance of the thermal management system. The plurality of first removable shims, the plurality of second removable shims, and the third removable shim may be manufactured in groups of different radial thicknesses, thereby accommodating various settings of a performance of the heat exchanger.

Additionally, the introduction of the plurality of first removable shims, the plurality of second removable shims, and the third removable shim may not affect attachment mechanisms for the heat exchanger and anchoring of a supporting structure for the outer cowl. The plurality of first removable shims, the plurality of second removable shims, and the third removable shim may become a part of the supporting structure of the outer cowl. Thus, the existing gas turbine engines may not require significant modifications to accommodate the plurality of first removable shims, the plurality of second removable shims, and the third removable shim. Further, a relative movement of the inlet end and the outlet end may be used to alter interactions with adjacent components and hardware, if interactions appear dominant during development and/or in-service operation of the gas turbine engine after a basic design of the gas turbine engine is fixed.

Thus, the plurality of first removable shims, the plurality of second removable shims, and the third removable shim may provide a simple and a cost-effective solution for varying the performance of the thermal management system. This may mitigate the need for an over-sized thermal management system for accommodating all combinations of known and unknown uncertainties since the performance of the thermal management system of the present disclosure may be adjusted based on the updated operational requirements of the gas turbine engine. This may further reduce a weight and a size of the gas turbine engine, thereby improving an overall efficiency of the gas turbine engine. Further, maintenance requirements of the thermal management system may be reduced due to a simple design of the plurality of first removable shims, the plurality of second removable shims, and the third removable shim, thereby reducing a downtime of the gas turbine engine.

In the proposed solution, the performance of the thermal management system is not adjusted based on multiple components forming the outer cowl which would have otherwise resulted in excessive costs associated with multiple moulds/pressings. Instead, the proposed solution includes use of additional shims for adjusting the performance of the thermal management system as the shims may be designed and manufactured at reduced cost.

In some embodiments, the bypass inner wall includes a first bypass surface facing the outer cowl and substantially parallel to the principal rotational axis. In some embodiments, the bypass inner wall further includes a second bypass surface extending from the first bypass surface and inclined obliquely relative to the principal rotational axis away from the outer cowl. In some embodiments, the bypass inner wall further includes a third bypass surface extending from and inclined obliquely to the second bypass surface. The third bypass surface is further inclined obliquely relative to the principal rotational axis towards the outer cowl. In some embodiments, the bypass inner wall further includes a fourth bypass surface extending from the third bypass surface and substantially parallel to the principal rotational axis.

The first bypass surface and the fourth bypass surface may allow the air flow to enter and exit a duct defined between the outer cowl and the bypass inner wall substantially parallel to the principal rotational axis. In some cases, the heat exchanger may be inclined relative to the principal rotational axis. The second and third bypass surfaces may be inclined to accommodate the heat exchanger (which may be inclined) between the outer cowl and the bypass inner wall.

In some embodiments, the outer cowl includes a first cowl surface facing the bypass inner wall and substantially parallel to the principal rotational axis. In some embodiments, the outer cowl further includes a second cowl surface facing the bypass inner wall and substantially parallel to the principal rotational axis. The second cowl surface is axially and radially spaced apart from the first cowl surface relative to the principal rotational axis. In some embodiments, the outer cowl further includes a third cowl surface extending between the first cowl surface and the second cowl surface. The third cowl surface is inclined obliquely relative to the principal rotational axis and substantially parallel to the third bypass surface of the bypass inner wall. The heat exchanger extends between the third cowl surface and the third bypass surface.

The first cowl surface and the second cowl surface may allow the air flow to enter and exit the duct defined between the outer cowl and the bypass inner wall substantially parallel to the principal rotational axis. Further, the third cowl surface may be inclined obliquely relative to the principal rotational axis to accommodate the heat exchanger (in an inclined configuration) between the outer cowl and the bypass inner wall.

In some embodiments, the outer cowl further includes a plurality of panels disposed circumferentially adjacent to each other relative to the principal rotational axis. Each panel from the plurality of panels defines a first circumferential edge and a second circumferential edge opposite to the first circumferential edge. Each panel includes a recess circumferentially extending partially from the second circumferential edge towards the first circumferential edge. In some embodiments, the outer cowl further includes a plurality of elastic lips corresponding to the plurality of panels. Each of the plurality of elastic lips circumferentially extends from the first circumferential edge of a corresponding panel towards the second circumferential edge of an adjacent panel from the plurality of panels. Each of the plurality of elastic lips is slidably and at least partially received on the recess of the adjacent panel.

The plurality of elastic lips may deflect to accommodate any gaps generated between the plurality of panels due to radially inward or outward movement of the plurality of panels at the inlet end or the outlet end of the outer cowl. The plurality of elastic lips may be provided at circumferentially adjoining interfaces between the plurality of panels, i.e., between the first and second circumferential edges. The plurality of elastic lips may ensure a continuous and smooth surface in a circumferential direction, thereby allowing conformance at various circumferential locations of the outer cowl. Thus, any mismatch between the plurality of panels due to the movement of the outer cowl may be mitigated.

In some embodiments, the thermal management system further includes a plurality of mechanical attachments corresponding to the plurality of elastic lips. Each of the plurality of mechanical attachments couples a corresponding elastic lip from the plurality of elastic lips to the recess of the adjacent panel. Each of the plurality of mechanical attachments (e.g., a bolt movable within a slot of the adjacent panel) may allow the corresponding elastic lip to move relative to the recess of the adjacent panel while being engaged with the recess of the adjacent panel at all times as the outer cowl is positionally adjusted relative to the bypass inner wall.

In some embodiments, the thermal management system further includes a plurality of first countersunk bolts corresponding to the plurality of first removable shims. Each of the plurality of first countersunk bolts extends through a corresponding first removable shim from the plurality of first removable shims and removably couples the corresponding first removable shim to each of the outer cowl and the corresponding inlet vane. The plurality of first countersunk bolts may removably couple the corresponding first removable shim to each of the outer cowl and the corresponding inlet vane, thereby allowing the corresponding first removable shim to be replaced or removed as per updated operational requirements of the gas turbine engine.

In some embodiments, the thermal management system further includes a plurality of second countersunk bolts corresponding to the plurality of second removable shims. Each of the second countersunk bolts extends through a corresponding second removable shim from the plurality of second removable shims and removably couples the corresponding second removable shim to each of the outer cowl and the corresponding outlet vane. The plurality of second countersunk bolts may removably couple the corresponding second removable shim to each of the outer cowl and the corresponding outlet vane, thereby allowing the corresponding second removable shim to be replaced or removed as per updated operational requirements of the gas turbine engine.

In some embodiments, the thermal management system further includes a plurality of first replacement shims corresponding to the plurality of first removable shims. Each of the plurality of first replacement shims is removably disposed between and engages the outer cowl and the corresponding inlet vane after removal of the corresponding first removable shim. The plurality of first replacement shims may allow the outer cowl to be positionally adjusted relative to the bypass inner wall by replacing the plurality of first removable shims with the plurality of first replacement shims.

In some embodiments, each of the plurality first replacement shims includes a thickness different from a thickness of each of the plurality of first removable shims. The radial distance between the inlet end of the outer cowl and the bypass inner wall may be increased or decreased by replacing the plurality of first removable shims with the plurality of first replacement shims, thereby altering the performance of the thermal management system based on updated operational requirements of the gas turbine engine.

In some embodiments, the thermal management system further includes a plurality of second replacement shims corresponding to the plurality of second removable shims. Each of the plurality of second replacement shims is removably disposed between and engages the outer cowl and the corresponding outlet vane after removal of the corresponding second removable shim. The plurality of second replacement shims may allow the outer cowl to be positionally adjusted relative to the bypass inner wall by replacing the plurality of second removable shims with the plurality of second replacement shims.

In some embodiments, each of the plurality second replacement shims includes a thickness different from a thickness of each of the plurality of second removable shims. The radial distance between the outlet end of the outer cowl and the bypass inner wall may be increased or decreased by replacing the plurality of second removable shims with the plurality of second replacement shims, thereby altering the performance of the thermal management system based on updated operational requirements of the gas turbine engine.

In some embodiments, the thermal management system further includes a third replacement shim. This shim is removably disposed between and engages the heat exchanger and the outer cowl after removal of the third removable shim. The third replacement shim may replace the third removable shim such that the heat exchanger remains engaged with the outer cowl as the outer cowl is positionally adjusted relative to the bypass inner wall. A thickness of the third replacement shim may be different from a thickness of the third removable shim.

According to a second aspect, there is provided a gas turbine engine. The gas turbine engine incudes a principal rotational axis and an engine core extending along the principal rotational axis. The gas turbine engine further incudes a nacelle circumferentially surrounding the engine core around the principal rotational axis. The gas turbine engine further incudes the thermal management system of the first aspect. The bypass inner wall of the thermal management system circumferentially surrounds the engine core around the principal rotational axis and extends along the principal rotational axis. The bypass inner wall is radially disposed between the engine core and the nacelle relative to the principal rotational axis, such that a main bypass duct is defined between the bypass inner wall and the nacelle.

According to a third aspect, there is provided a method for thermal management of a gas turbine engine having a principal rotational axis, an engine core, and a nacelle. The method includes providing a bypass inner wall circumferentially surrounding the engine core around the principal rotational axis and extending along the principal rotational axis. The bypass inner wall is radially disposed between the engine core and the nacelle relative to the principal rotational axis, such that a main bypass duct is defined between the bypass inner wall and the nacelle. The method further includes providing an outer cowl circumferentially surrounding and radially spaced apart from the bypass inner wall relative to the principal rotational axis. The outer cowl extends along the principal rotational axis between an inlet end and an outlet end. The outer cowl is disposed within the main bypass duct. The method further includes providing a plurality of inlet vanes extending from the bypass inner wall towards the outer cowl and disposed proximal to the inlet end of the outer cowl. The plurality of inlet vanes are circumferentially spaced apart from each other relative to the principal rotational axis. The method further includes providing a plurality of outlet vanes extending from the bypass inner wall towards the outer cowl and disposed proximal to the outlet end of the outer cowl. The plurality of outlet vanes are circumferentially spaced apart from each other relative to the principal rotational axis. The method further includes providing a heat exchanger extending from the bypass inner wall towards the outer cowl and axially disposed between the inlet end and the outlet end relative to the principal rotational axis.

The method further includes providing a plurality of first removable shims corresponding to the plurality of inlet vanes. Each first removable shim extends between and engages the outer cowl and a corresponding inlet vane from the plurality of inlet vanes. The method further includes providing a plurality of second removable shims corresponding to the plurality of outlet vanes. Each second removable shim extends between and engages the outer cowl and a corresponding outlet vane from the plurality of outlet vanes. The method further includes providing a third removable shim extending between and engaging the heat exchanger and the outer cowl. The third removable shim circumferentially extends around the principal rotational axis. The method further includes positionally adjusting the outer cowl relative to the bypass inner wall by: removing each of the plurality of first removable shims from between the corresponding inlet vane and the outer cowl; removing each of the plurality of second removable shims from between the corresponding outlet vane and the outer cowl; and removing the third removable shim from between the heat exchanger and the outer cowl.

In some embodiments, the method further includes providing a plurality of first replacement shims corresponding to the plurality of first removable shims. Each of the plurality first replacement shims includes a thickness different from a thickness of each of the plurality of first removable shims. In some embodiments, the method further includes removably disposing each of the plurality of first replacement shims between the outer cowl and the corresponding inlet vane after removal of the corresponding first removable shim, such that each of the plurality of first replacement shims engages each of the outer cowl and the corresponding inlet vane.

In some embodiments, the method further includes providing a plurality of second replacement shims corresponding to the plurality of second removable shims. Each of the plurality second replacement shims includes a thickness different from a thickness of each of the plurality of second removable shims. In some embodiments, the method further includes removably disposing each of the plurality of second replacement shims between the outer cowl and the corresponding outlet vane after removal of the corresponding second removable shim, such that each of the plurality of second replacement shims engages each of the outer cowl and the corresponding outlet vane.

In some embodiments, the method further includes removably disposing a third replacement shim between the heat exchanger and the outer cowl after removal of the third removable shim, such that the third replacement shim engages each of the heat exchanger and the outer cowl. A thickness of the third replacement shim may be different from a thickness of the third removable shim.

As noted elsewhere herein, the present disclosure may relate to a gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

Arrangements of the present disclosure may be particularly, although not exclusively, beneficial for fans that are driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example, one, two, or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other.

Gas turbine engines in accordance with the present disclosure may have any desired bypass ratio, where the bypass ratio is defined as the ratio of the mass flow rate of the flow through the main bypass duct to the mass flow rate of the flow through the core at cruise conditions. In some arrangements the bypass ratio may be greater than (or on the order of) any of the following: 10, 10.5, 11, 11.5, 12, 12.5, 13, 13.5, 14, 14.5, 15, 15.5, 16, 16.5, 17, 17.5, 18, 18.5, 19, 19.5 or 20. The bypass ratio may be in an inclusive range bounded by any two of the values in the previous sentence (i.e. the values may form upper or lower bounds), for example in the range of from 12 to 16, 13 to 15, or 13 to 14. The main bypass duct may be substantially annular. The main bypass duct may be radially outside the engine core. The radially outer surface of the main bypass duct may be defined by a nacelle and/or a fan case.

Specific thrust of an engine may be defined as the net thrust of the engine divided by the total mass flow through the engine. At cruise conditions, the specific thrust of an engine described and/or claimed herein may be less than (or on the order of) any of the following: 110 Nkg$^{-1}$s, 105 Nkg$^{-1}$s, 100 Nkg$^{-1}$s, 95 Nkg$^{-1}$s, 90 Nkg$^{-1}$s, 85 Nkg$^{-1}$s or 80 Nkg$^{-1}$s. The specific thrust may be in an inclusive range bounded by any two of the values in the previous sentence (i.e., the values may form upper or lower bounds), for example in the range of from 80 Nkg$^{-1}$s to 100 Nkg$^{-1}$s, or 85 Nkg$^{-1}$s to 95 Nkg$^{-1}$s. Such engines may be particularly efficient in comparison with conventional gas turbine engines.

A fan blade and/or aerofoil portion of a fan blade described and/or claimed herein may be manufactured from any suitable material or combination of materials. For example, at least a part of the fan blade and/or aerofoil may be manufactured at least in part from a composite, for example a metal matrix composite and/or an organic matrix composite, such as carbon fibre.

The fan of a gas turbine as described and/or claimed herein may have any desired number of fan blades, for example 14, 16, 18, 20, 22, 24 or 26 fan blades.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

BRIEF DESCRIPTION OF THE DRAWINGS

Embodiments will now be described by way of example only, with reference to the Figures:

FIG. 9A is a schematic sectional view of the outer cowl taken along a section line P-P' or a section line Q-Q' shown in FIG. 3;

FIG. 9B is a schematic sectional view of the outer cowl taken along a section line R-R' or a section line S-S' shown in FIG. 5;

FIG. 9C is a schematic sectional view of the outer cowl taken along a section line T-T' or a section line U-U' shown in FIG. 6.

DETAILED DESCRIPTION OF THE DISCLOSURE

Aspects and embodiments of the present disclosure will now be discussed with reference to the drawings. Further aspects and embodiments will be apparent to those skilled in the art.

Figure 1:
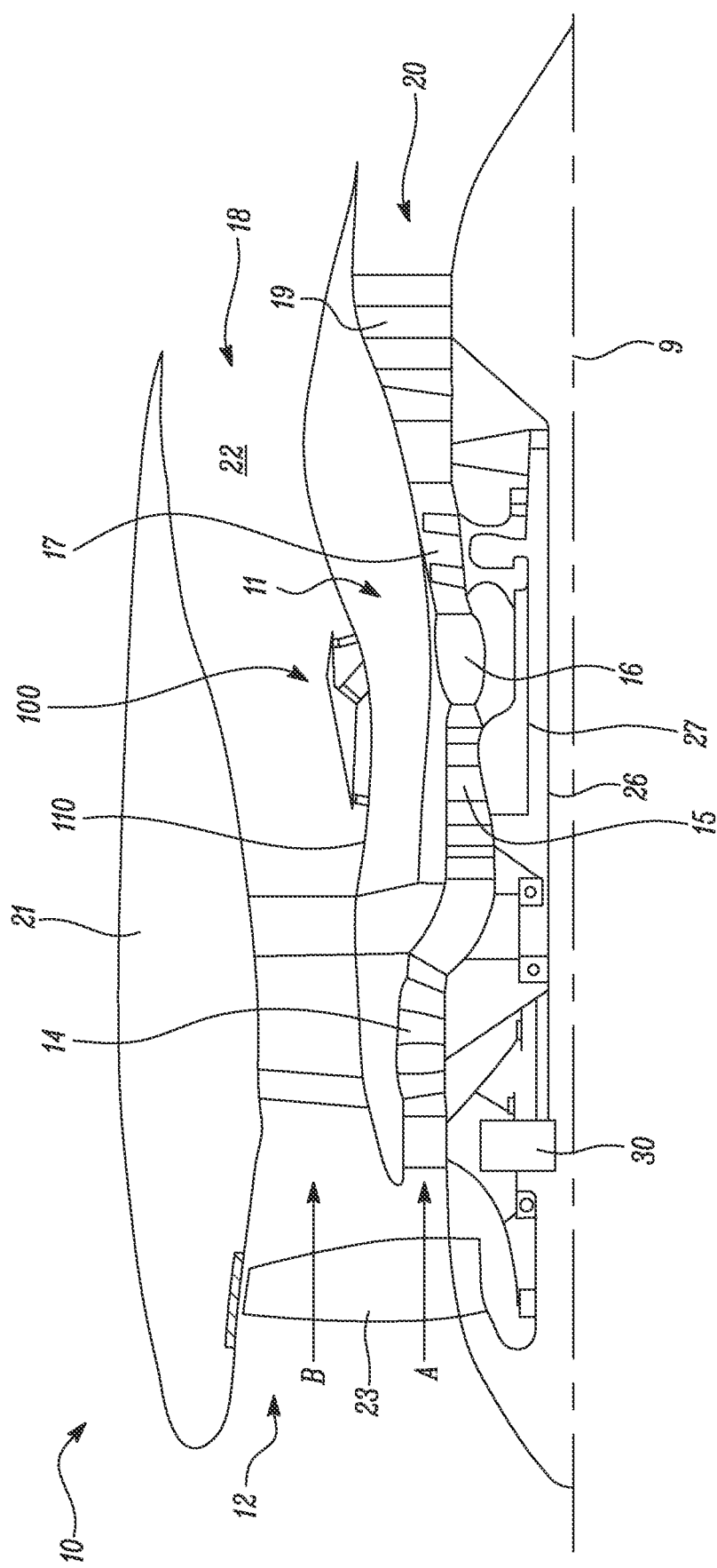
FIG. 1 is a sectional side view of a gas turbine engine.

FIG. 1 illustrates a gas turbine engine 10 having a principal rotational axis 9. The gas turbine engine 10 comprises an air intake 12 and a propulsive fan 23 that generates two airflows: a core airflow A and a bypass airflow B. The gas turbine engine 10 comprises an engine core 11 extending along the principal rotational axis 9 and receiving the core airflow A. The engine core 11 comprises, in axial flow series, a low pressure compressor 14, a high pressure compressor 15, combustion equipment 16, a high pressure turbine 17, a low pressure turbine 19, and a core exhaust nozzle 20. The gas turbine engine 10 further comprises a nacelle 21 circumferentially surrounding the engine core 11 around the principal rotational axis 9 and defining a main bypass duct 22 and a bypass exhaust nozzle 18. The bypass airflow B flows through the main bypass duct 22. The fan 23 is attached to and driven by the low pressure turbine 19 via a shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the core exhaust nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

The gas turbine engine 10 further includes a thermal management system 100. The thermal management system 100 may manage heat generated and rejected by the gas turbine engine 10 during operation to ensure that all engine fluids (or fluids from associated equipment) within the gas turbine engine 10 are maintained at safe and effective temperatures at all times. In some embodiments, the thermal management system 100 may be disposed in fluid communication with the main bypass duct 22 and may receive at least a portion of the bypass airflow B from the main bypass duct 22. For example, the bypass airflow B may be utilized in the thermal management system 100 for cooling the engine fluids.

Figure 2:
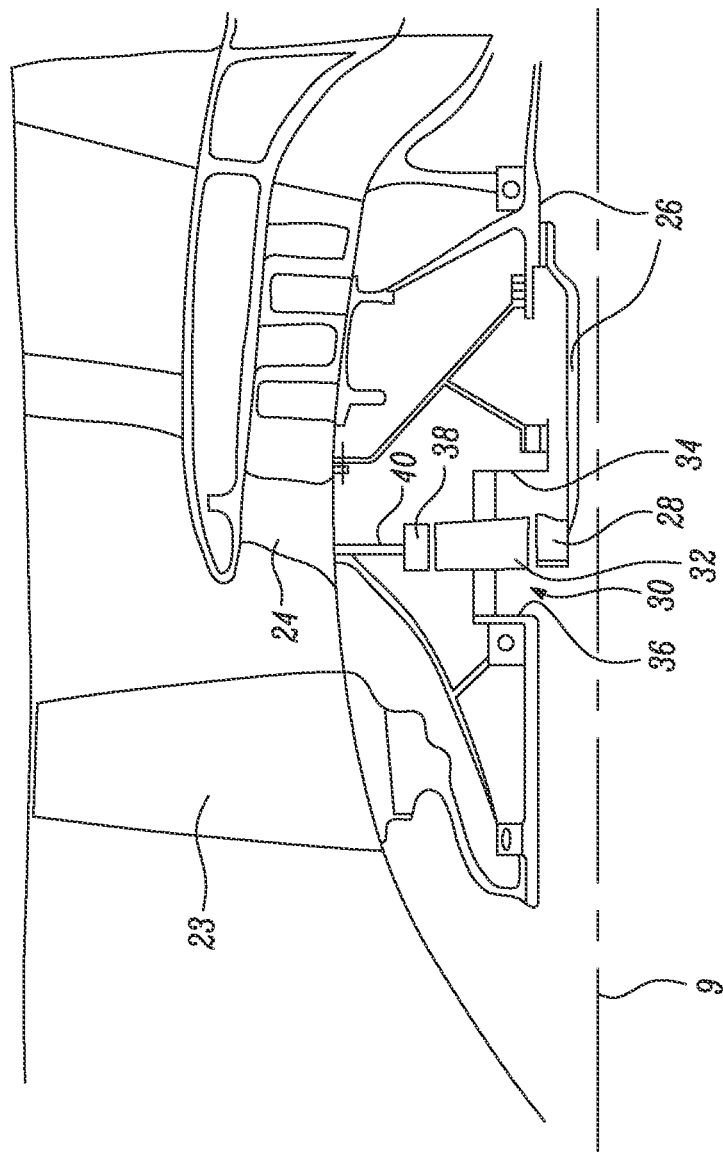
FIG. 2 is a close-up sectional side view of an upstream portion of a gas turbine engine.

An exemplary arrangement for a geared fan gas turbine engine 10 is shown in FIG. 2. The low pressure turbine 19 (see FIG. 1) drives the shaft 26, which is coupled to a sun wheel, or a sun gear 28 of the epicyclic gearbox 30. Radially outwardly of the sun gear 28 and intermeshing therewith is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis. The planet carrier 34 is coupled via linkages 36 to the fan 23 in order to drive its rotation about the principal rotational axis 9. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e., not including the fan 23), respectively, and/or the turbine and compressor stages that are connected together by the shaft 26 with the lowest rotational speed in the engine (i.e., not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be a first, or lowest pressure, compression stage.

Accordingly, the present disclosure extends to a gas turbine engine having any arrangement of gearbox styles (for example, star or planetary), support structures, input and output shaft arrangement, and bearing locations. Optionally, the epicyclic gearbox 30 may drive additional and/or alternative components (e.g., the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine 10 shown in FIG. 1 has a split flow nozzle 18, 20 meaning that the flow through the main bypass duct 22 has its own bypass exhaust nozzle 18 that is separate to and radially outside the core exhaust nozzle 20. However, this is not limiting, and any aspect of the present disclosure may also apply to engines in which the flow through the main bypass duct 22 and the flow through the engine core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle), or turboprop engine, for example. In some arrangements, the gas turbine engine 10 may not comprise the epicyclic gearbox 30.

The geometry of the gas turbine engine 10, and components thereof, is defined by a conventional axis system, comprising an axial direction (which is aligned with the principal rotational axis 9), a radial direction (in the bottom-to-top direction in FIG. 1), and a circumferential direction (perpendicular to the page in the FIG. 1 view). The axial, radial and circumferential directions are mutually perpendicular.

Figure 3:
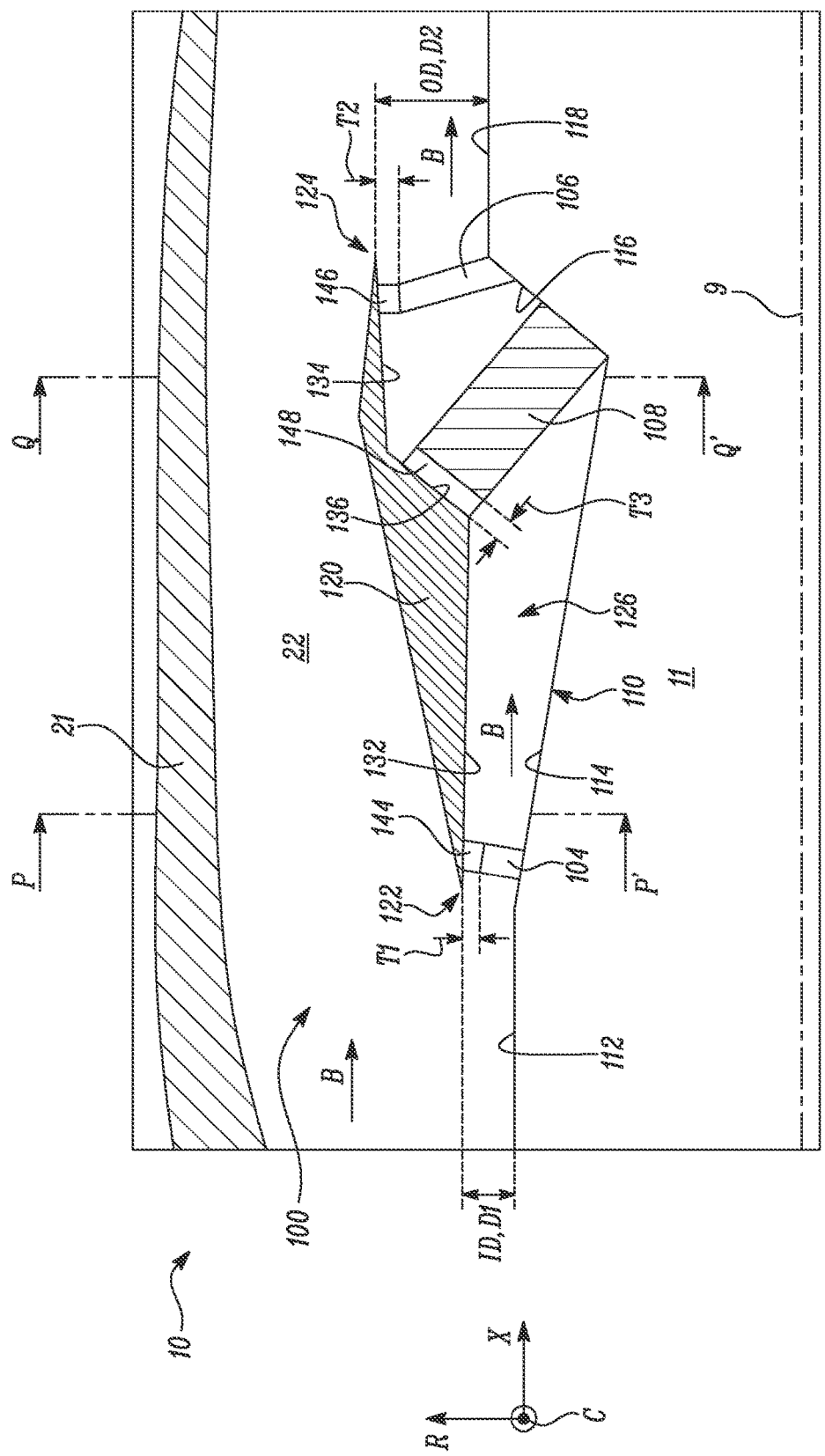
FIG. 3 is a schematic sectional side view of a thermal management system for the gas turbine engine.

FIG. 3 is a schematic sectional side view of a thermal management system 100 for the gas turbine engine 10. Specifically, FIG. 3 illustrates a schematic sectional side view of a portion of the gas turbine engine 10. A radial direction R is defined with respect to the principal rotational axis 9 of the gas turbine engine 10 in the bottom-to-top direction as shown in FIG. 3. As used herein, terms that refer to a radial direction, such as "radially outer", "radially inner", "radially extends", "radially inwards", "radially outwards", "radially spaced apart", "radial thickness", and "radially proximal", are with respect to the radial direction R. A circumferential direction C is defined with respect to the principal rotational axis 9 perpendicular to the page in the FIG. 3 view. As used herein, terms that refer to a circumferential direction, such as "circumferentially extends", "circumferentially extending", "circumferentially surrounding", "circumferentially inclined", "circumferentially with respect to", and "circumferentially disposed between", are with respect to the circumferential direction C. An axial direction X is defined that is aligned with the principal rotational axis 9 of the gas turbine engine 10. As used herein, terms that refer to an axial direction, such as "axially disposed", "axially extends", "axially spaced apart", and "axially proximal", are with respect to the axial direction X.

Referring to FIGS. 1 and 3, the thermal management system 100 includes a bypass inner wall 110 circumferentially surrounding the engine core 11 around the principal rotational axis 9 and extending along the principal rotational axis 9. In some embodiments, the bypass inner wall 110 may include multiple section joined together to form a continuous wall surface. The bypass inner wall 110 is radially disposed between the engine core 11 and the nacelle 21 relative to the principal rotational axis 9, such that the main bypass duct 22 is defined between the bypass inner wall 110 and the nacelle 21. Thus, the main bypass duct 22 is delimited radially between the nacelle 21 and the bypass inner wall 110 of the thermal management system 100. In some embodiments, the main bypass duct 22 may receive the bypass airflow B generated by the fan.

The thermal management system 100 further includes an outer cowl 120 circumferentially surrounding and radially spaced apart from the bypass inner wall 110 relative to the principal rotational axis 9. The outer cowl 120 extends along the principal rotational axis 9 between an inlet end 122 and an outlet end 124. The outer cowl 120 is disposed within the main bypass duct 22. In some embodiments, the outer cowl 120 and the bypass inner wall 110 define an outer cowl duct 126 therebetween. In some embodiment, the outer cowl duct 126 may receive at least a portion of the bypass airflow B flowing through the main bypass duct 22. Specifically, at least a portion of the bypass airflow B may enter the outer cowl duct 126 from the inlet end 122 of the outer cowl 120 and exits the outer cowl duct 126 from the outlet end 124 of the outer cowl 120.

It should be understood that the outer cowl duct 126 may take a variety of forms, orientations, and geometries. The outer cowl duct 126 may include a variety of transitions, cross sectional areas, surface textures, and may be made of a variety of materials or combination of materials.

As shown in FIG. 3, in some embodiments, the bypass inner wall 110 includes a first bypass surface 112 facing the outer cowl 120 and substantially parallel to the principal rotational axis 9. In some embodiments, the bypass inner wall 110 further includes a second bypass surface 114 extending from the first bypass surface 112 and inclined obliquely relative to the principal rotational axis 9 away from the outer cowl 120. In some embodiments, the bypass inner wall 110 further includes a third bypass surface 116 extending from and inclined obliquely to the second bypass surface 114. In some embodiments, the third bypass surface 116 is further inclined obliquely relative to the principal rotational axis 9 towards the outer cowl 120.

In the illustrated embodiment of FIG. 3, an inclination angle of the third bypass surface 116 relative to the principal rotational axis 9 is greater than an inclination angle of the second bypass surface 114 relative to the principal rotational axis 9. In some embodiments, the bypass inner wall 110 further includes a fourth bypass surface 118 extending from the third bypass surface 116 and substantially parallel to the principal rotational axis 9. The first bypass surface 112 and the fourth bypass surface 118 may allow the bypass airflow B to enter and exit the outer cowl duct 126 substantially parallel to the principal rotational axis 9.

In some embodiments, the outer cowl 120 includes a first cowl surface 132 facing the bypass inner wall 110 and substantially parallel to the principal rotational axis 9. In some embodiments, the outer cowl 120 further includes a second cowl surface 134 facing the bypass inner wall 110 and substantially parallel to the principal rotational axis 9. In some embodiments, the second cowl surface 134 is axially and radially spaced apart from the first cowl surface 132 relative to the principal rotational axis 9. In some embodiments, the first and second cowl surfaces 132, 134 may allow the bypass airflow B to enter and exit the outer cowl duct 126 substantially parallel to the principal rotational axis 9. In some embodiments, the outer cowl 120 further includes a third cowl surface 136 extending between the first cowl surface 132 and the second cowl surface 134. In some embodiments, the third cowl surface 136 is inclined obliquely relative to the principal rotational axis 9 and substantially parallel to the third bypass surface 116 of the bypass inner wall 110.

The thermal management system 100 further includes a plurality of inlet vanes 104 extending from the bypass inner wall 110 towards the outer cowl 120 and disposed proximal to the inlet end 122 of the outer cowl 120. The plurality of inlet vanes 104 are circumferentially spaced apart from each other relative to the principal rotational axis 9. In the illustrated embodiment of FIG. 3, only one inlet vane 104 from the plurality of inlet vanes 104 is visible.

The thermal management system 100 further includes a plurality of outlet vanes 106 extending from the bypass inner wall 110 towards the outer cowl 120 and disposed proximal to the outlet end 124 of the outer cowl 120. The plurality of outlet vanes 106 are circumferentially spaced apart from each other relative to the principal rotational axis 9. In the illustrated embodiment of FIG. 3, only one outlet vane 106 from the plurality of outlet vanes 106 is visible.

The thermal management system 100 further includes a heat exchanger 108 extending from the bypass inner wall 110 towards the outer cowl 120 and axially disposed between the inlet end 122 and the outlet end 124 relative to the principal rotational axis 9. In some embodiments, the heat exchanger 108 extends between the third cowl surface 136 of the outer cowl 120 and the third bypass surface 116 of the bypass inner wall 110.

In some embodiments, the heat exchanger 108 may receive at least a portion of the bypass airflow B received within the outer cowl duct 126. In some embodiments, the heat exchanger 108 may be disposed in fluid communication with an engine cooling circuit or an accessory (e.g., a generator) cooling circuit. The heat exchanger 108 may exchange heat between flow streams. For example, the heat exchanger 108 may exchange heat between the bypass airflow B and an engine coolant utilized in the engine cooling circuit.

The heat exchanger 108 may be made of a variety of materials and components. Further, the heat exchanger 108 may be any type of heat exchanger, such as, e.g., a matrix heat exchanger, a plate and fin type heat exchanger, etc. In the illustrated embodiment of FIG. 3, the heat exchanger 108 is inclined obliquely relative to the principal rotational axis 9. However, the heat exchanger 108 may also have other configurations based on a relative shape, orientation, and size of the outer cowl duct 126. The heat exchanger 108 may include a variety of forms, and may have a variety of configurations, orientation, shapes, lengths, etc. for exchanging heat. For example, the heat exchanger 108 may also be disposed perpendicular to the principal rotational axis 9 as shown in FIG. 4.

Figure 4:
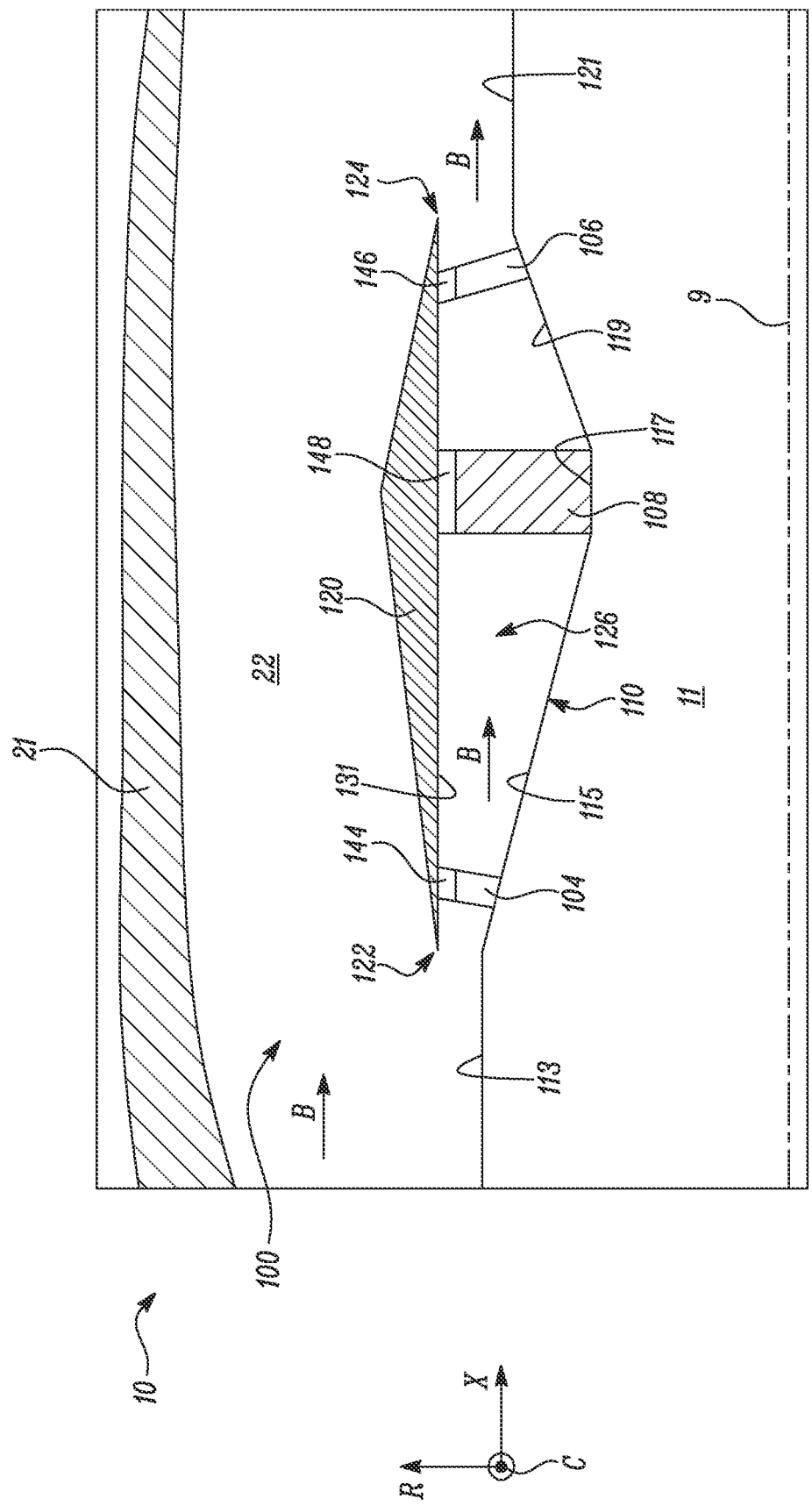
FIG. 4 is a schematic sectional side view of the thermal management system.

Referring to FIG. 4, the bypass inner wall 110 further includes a first bypass surface 113 facing the outer cowl 120 and substantially parallel to the principal rotational axis 9. In some embodiments, the bypass inner wall 110 further includes a second bypass surface 115 extending from the first bypass surface 112 and inclined obliquely relative to the principal rotational axis 9 away from the outer cowl 120. In some embodiments, the bypass inner wall 110 further includes a third bypass surface 117 extending from the second bypass surface 115 substantially parallel to the principal rotational axis 9. In some embodiments, the bypass inner wall 110 further includes a fourth bypass surface 119 extending from the third bypass surface 117 and inclined obliquely relative to the principal rotational axis 9 towards the outer cowl 120. In some embodiments, the bypass inner wall 110 further includes a fifth bypass surface 121 extending from the fourth bypass surface 119 and substantially parallel to the principal rotational axis 9. The first bypass surface 113 and the fifth bypass surface 121 may allow the bypass airflow B to enter and exit the outer cowl duct 126 substantially parallel to the principal rotational axis 9.

In some embodiments, the outer cowl 120 further includes a cowl surface 131 facing the bypass inner wall 110 and substantially parallel to the principal rotational axis 9. In some embodiments, the heat exchanger 108 extends between the cowl surface 131 of the outer cowl 120 and the third bypass surface 117 of the bypass inner wall 110 substantially perpendicular to the principal rotational axis 9. The thermal management system 100 further includes the plurality of inlet vanes 104 extending from the bypass inner wall 110 towards the outer cowl 120 and disposed proximal to the inlet end 122 of the outer cowl 120. The thermal management system 100 further includes the plurality of outlet vanes 106 extending from the bypass inner wall 110 towards the outer cowl 120 and disposed proximal to the outlet end 124 of the outer cowl 120.

In some embodiments, the heat exchanger 108 may include a unitary body circumferentially extending around the principal rotational axis 9. In some embodiments, the heat exchanger 108 may only partially extend around the principal rotational axis 9. Any number of heat exchangers 108 may be used with the thermal management system 100. In a non-example, the gas turbine engine 10 may include multiple heat exchangers 108 disposed within the outer cowl duct 126.

Referring again to FIG. 3, the thermal management system 100 further includes a plurality of first removable shims 144 corresponding to the plurality of inlet vanes 104. Each first removable shim 144 from the plurality of first removable shims 144 extends between and engages the outer cowl 120 and a corresponding inlet vane 104 from the plurality of inlet vanes 104. Specifically, each of the plurality of first removable shims 144 engages the first cowl surface 132 of the outer cowl 120 and the corresponding inlet vane 104. In the illustrated embodiment of FIG. 3, only one first removable shim 144 from the plurality of first removable shims 144 is visible.

Each of the plurality of first removable shims 144 is removable from between the corresponding inlet vane 104 and the outer cowl 120. In some embodiments, each of the plurality of first removable shims 144 is removable to vary a radial distance ID between the inlet end 122 of the outer cowl 120 and the bypass inner wall 110. In the illustrated embodiment of FIG. 3, each of the plurality of first removable shims 144 is disposed between the outer cowl 120 and the corresponding inlet vane 104, such that the inlet end 122 of the outer cowl 120 is radially spaced apart from the bypass inner wall 110 relative to the principal rotational axis 9 by a radial distance D1. In some embodiments, each of the plurality first removable shims 144 includes a thickness T1. In some embodiments, the thickness T1 may be a radial thickness of each of the plurality first removable shims 144.

The thermal management system 100 further includes a plurality of second removable shims 146 corresponding to the plurality of outlet vanes 106. Each second removable shim 146 from the plurality of second removable shims 146 extends between and engages the outer cowl 120 and a corresponding outlet vane 106 from the plurality of outlet vanes 106. Specifically, each of the plurality of second removable shims 146 engages the second cowl surface 134 of the outer cowl 120 and the corresponding outlet vane 106. In the illustrated embodiment of FIG. 3, only one second removable shim 146 from the plurality of second removable shims 146 is visible.

Each of the plurality of second removable shims 146 is removable from between the corresponding outlet vane 106 and the outer cowl 120. In some embodiments, each of the plurality of second removable shims 146 is removable to vary a radial distance OD between the outlet end 124 of the outer cowl 120 and the bypass inner wall 110. In the illustrated embodiment of FIG. 3, each of the plurality of second removable shims 146 is disposed between the outer cowl 120 and the corresponding outlet vane 106, such that the outlet end 124 of the outer cowl 120 is radially spaced apart from the bypass inner wall 110 relative to the principal rotational axis 9 by a radial distance D2. In some embodiments, each of the plurality second removable shims 146 includes a thickness T2. In some embodiments, the thickness T2 may be a radial thickness of each of the plurality second removable shims 146.

In some embodiments, increase in the radial distances ID, OD may allow an increase in the bypass airflow B flowing through the outer cowl duct 126, thereby enhancing a heat rejection capacity of the heat exchanger 108. Alternatively, decrease in the radial distances ID, OD may allow a decrease in the bypass airflow B flowing through the outer cowl duct 126, thereby lowering the heat rejection capacity of the heat exchanger 108. Thus, the plurality of first removable shims 144 and the plurality of second removable shims 146 may allow the outer cowl 120 to be geometrically shifted in the axial direction X and/or the radial direction R relative to the principal rotational axis 9, thereby allowing variation in a performance of the heat exchanger 108 based on updated operational requirements of the gas turbine engine 10.

The thermal management system 100 further includes a third removable shim 148 extending between and engaging the heat exchanger 108 and the outer cowl 120. Specifically, the third removable shim 148 engages the third cowl surface 136 of the outer cowl 120 and the heat exchanger 108. In some embodiments, the third removable shim 148 circumferentially extends around the principal rotational axis 9. In some embodiments, the third removable shim 148 is removable from between the heat exchanger 108 and the outer cowl 120. In some embodiments, the third removable shim 148 is removable such that the heat exchanger 108 remains engaged with the outer cowl 120 (or the third cowl surface 136 of the outer cowl 120). The third removable shim 148 has a thickness T3.

The introduction of the plurality of first removable shims 144, the plurality of second removable shims 146, and the third removable shim 148 may not affect attachment mechanisms for the heat exchanger 108 and anchoring of a supporting structure for the outer cowl 120. The plurality of first removable shims 144, the plurality of second removable shims 146, and the third removable shim 148 may become a part of the supporting structure for the outer cowl 120. Thus, the existing gas turbine engines 10 may not require significant modifications to accommodate the plurality of first removable shims 144, the plurality of second removable shims 146, and the third removable shim 148.

Figure 5:
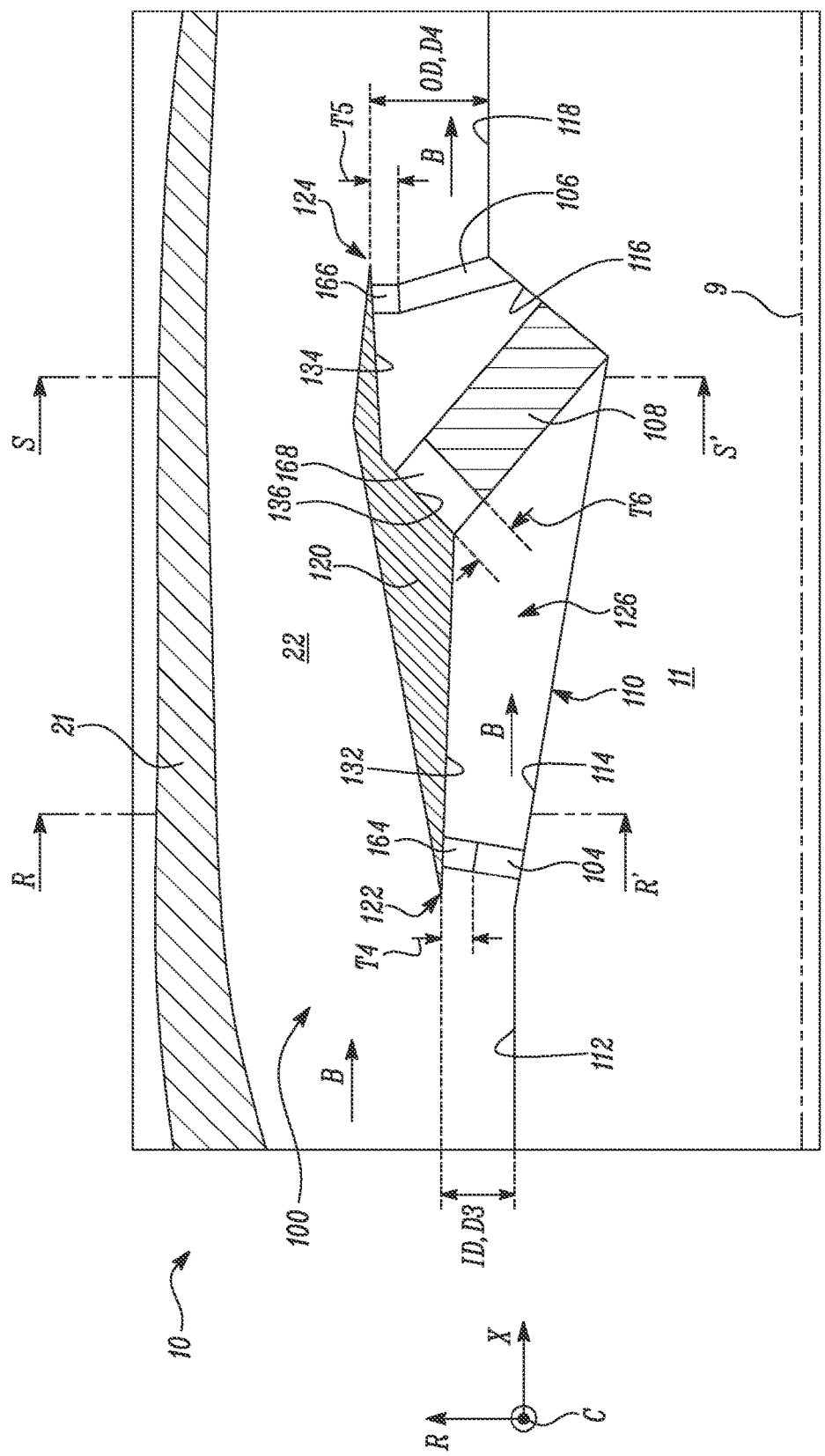
FIG. 5 is a schematic sectional side view of the thermal management system where each of a plurality of first removable shims is replaced by a corresponding first replacement shim, each of a plurality of second removable shims is replaced by a corresponding second replacement shim, and a third removable shim is replaced by a third replacement shim.

FIG. 5 is a schematic sectional side view of the thermal management system 100 where each of the plurality of first removable shims 144 (shown in FIG. 3) is replaced by a corresponding first replacement shim 164, each of the plurality of second removable shims 146 (shown in FIG. 3) is replaced by a corresponding second replacement shim 166, and the third removable shim 148 (shown in FIG. 3) is replaced by a third replacement shim 168. In some embodiments, the thermal management system 100 further includes the plurality of first replacement shims 164 corresponding to the plurality of first removable shims 144, the plurality of second replacement shims 166 corresponding to the plurality of second removable shims 146, and the third replacement shim 168 corresponding to the third removable shim 148.

In the illustrated embodiment of FIG. 5, each of the plurality of first replacement shims 164 is removably disposed between and engages the outer cowl 120 and the corresponding inlet vane 104 after removal of the corresponding first removable shim 144. In some embodiments, each of the plurality of second replacement shims 166 is removably disposed between and engages the outer cowl 120 and the corresponding outlet vane 106 after removal of the corresponding second removable shim 146. In some embodiments, the third replacement shim 168 is removably disposed between and engages the heat exchanger 108 and the outer cowl 120 after removal of the third removable shim 148. In some embodiments, each of the plurality of first removable shims 144, each of the plurality of second removable shims 146, and the third removable shim 148 may be manually replaced with a corresponding first replacement shim 164, a corresponding second replacement shim 166, and the third replacement shim 168, respectively, e.g., during maintenance of the gas turbine engine 10.

In some embodiments, each of the plurality of first replacement shims 164 includes a thickness T4 different from the thickness T1 (shown in FIG. 3) of each of the plurality of first removable shims 144. In the illustrated embodiment of FIG. 5, the thickness T4 of each of the plurality of first replacement shims 164 is greater than the thickness T1 of each of the plurality of first removable shims 144 and the inlet end 122 of the outer cowl 120 is radially spaced apart from the bypass inner wall 110 relative to the principal rotational axis 9 by a radial distance D3 greater than the radial distance D1 (shown in FIG. 3).

In some embodiments, each of the plurality of second replacement shims 166 includes a thickness T5 different from the thickness T2 (shown in FIG. 3) of each of the plurality of second removable shims 146. In the illustrated embodiment of FIG. 5, the thickness T5 of each of the plurality of second replacement shims 166 is greater than the thickness T2 of each of the plurality of second removable shims 146 and the outlet end 124 of the outer cowl 120 is radially spaced apart from the bypass inner wall 110 relative to the principal rotational axis 9 by a radial distance D4 greater than the radial distance D2 (shown in FIG. 3).

Thus, the plurality of first replacement shims 164, the plurality of second replacement shims 166, and the third replacement shim 166 may geometrically shift or move the outer cowl 120 radially outwards relative to the principal rotational axis, thereby increasing a flow of air (i.e., the bypass airflow B) through the heat exchanger 108. This may allow a performance of the thermal management system 100 to be adjusted based on updated operational requirements of the gas turbine engine 10. In the illustrated embodiment of FIG. 5, a thickness T6 of the third replacement shim 168 is greater than the thickness T3 of the third removable shim 148 (shown in FIG. 3). In some embodiments, the third replacement shim 168 may be suitably chosen such that the heat exchanger 108 remains engaged with the outer cowl 120.

Figure 6:
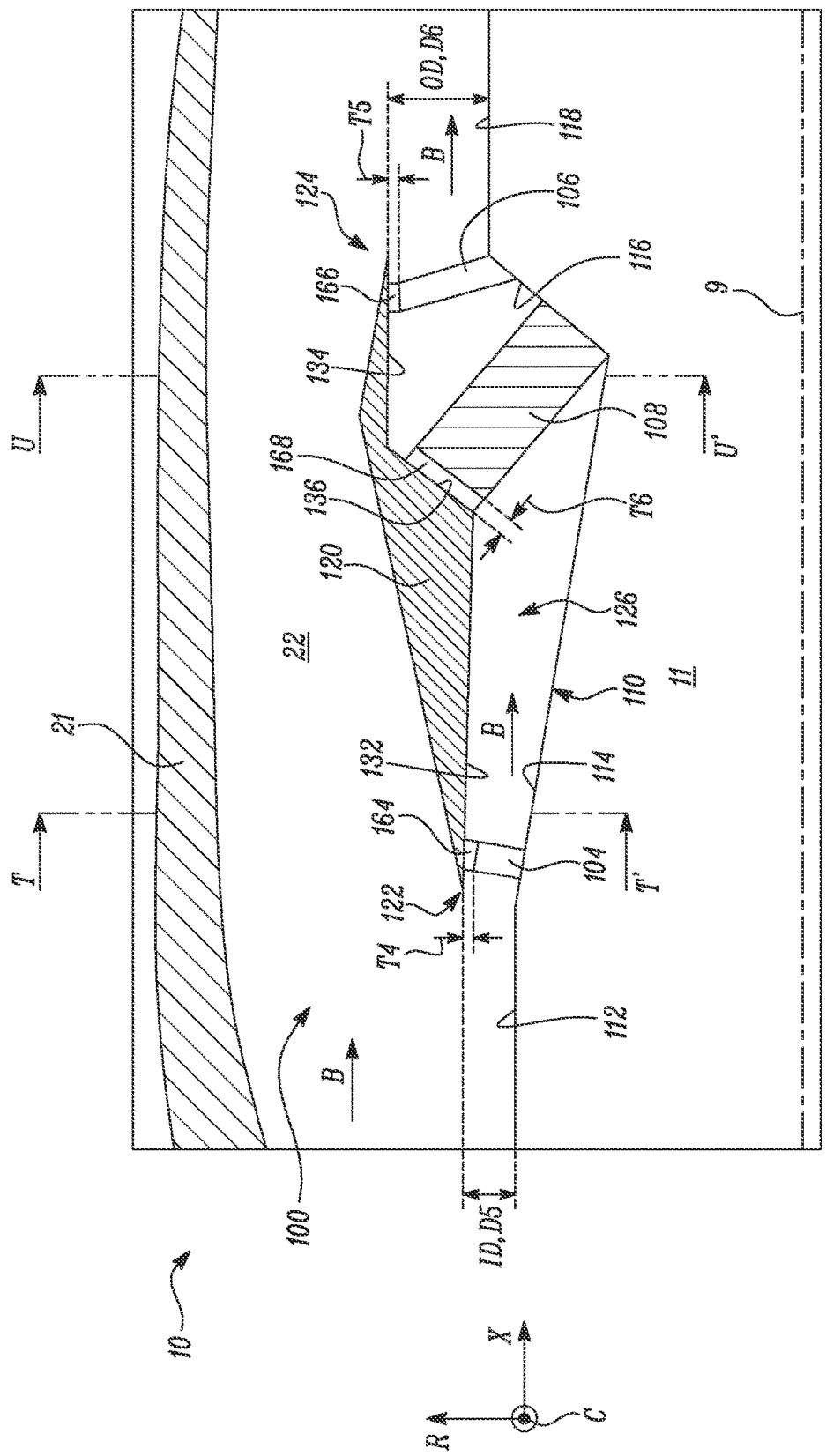
FIG. 6 is a schematic sectional side view of the thermal management system where each of the plurality of first removable shims is replaced by the corresponding first replacement shim, each of the plurality of second removable shims is replaced by the corresponding second replacement shim, and the third removable shim is replaced by the third replacement shim.

FIG. 6 is a schematic sectional side view of the thermal management system 100 where each of the plurality of first removable shims 144 (shown in FIG. 3) is replaced by the corresponding first replacement shim 164, each of the plurality of second removable shims 146 (shown in FIG. 3) is replaced by the corresponding second replacement shim 166, and the third removable shim 148 (shown in FIG. 3) is replaced by the corresponding third replacement shim 168. However, in the illustrated embodiment of FIG. 6, the thickness T4 of each of the plurality of first replacement shims 164 is lesser than the thickness T1 of each of the plurality of first removable shims 144 (shown in FIG. 3), the thickness T5 of each of the plurality of second replacement shims 166 is lesser than the thickness T2 of each of the plurality of second removable shims 146 (shown in FIG. 3), and the thickness T6 of the third replacement shim 168 is lesser than the thickness T3 of the third removable shim 148 (shown in FIG. 3).

In the illustrated embodiment of FIG. 6, the inlet end 122 of the outer cowl 120 is radially spaced apart from the bypass inner wall 110 relative to the principal rotational axis 9 by a radial distance D5 lesser than the radial distance D1 (shown in FIG. 3). Further, the outlet end 124 of the outer cowl 120 is radially spaced apart from the bypass inner wall 110 relative to the principal rotational axis 9 by a radial distance D6 lesser than the radial distance D2 (shown in FIG. 3).

Thus, the plurality of first replacement shims 164, the plurality of second replacement shims 166, and the third replacement shim 168 may geometrically shift or move the outer cowl 120 radially inwards relative to the principal rotational axis 9, thereby reducing the flow of air (i.e., the bypass airflow B) through the heat exchanger 108. This may allow the performance of the thermal management system 100 to be adjusted based on updated operational requirements of the gas turbine engine 10.

It should be understood that the plurality of first removable shims 144 (shown in FIG. 3), the plurality of second removable shims 146 (see FIG. 3), and the third removable shim 148 (see FIG. 3) may be simultaneously replaceable or individually replaceable. In some embodiments, the plurality of first replacement shims 164, the plurality of second replacement shims 166, and the third replacement shim 168 may be manufactured in groups of different thicknesses, thereby accommodating various settings of a performance of the heat exchanger 108.

Thus, the plurality of first removable shims 144 (shown in FIG. 3), the plurality of second removable shims 146 (shown in FIG. 3), and the third removable shim 148 (shown in FIG. 3) may provide a simple and a cost-effective solution for varying the performance of the thermal management system 100 after a design of the gas turbine engine 10 has been fixed. Further, maintenance requirements of the thermal management system 100 may be reduced due to the simple design of the shims, thereby reducing a downtime of the gas turbine engine 10.

It should be understood that the radial distance ID between the inlet end 122 of the outer cowl 120 and the bypass inner wall 110 and the radial distance OD between the outlet end 124 of the outer cowl 120 and the bypass inner wall 110 may be adjusted manually (through manual replacement of shims) or automatically. In the latter case, the thermal management system 100 may additionally include articulating joints, pivots, levers, etc., for adjusting the outer cowl 120. For example, hydraulic/pneumatic systems may shift the outer cowl 120 or the whole thermal management system 100 including the outer cowl 120 and the heat exchanger 108. Alternative technologies may include use of shape memory alloys, etc.

Figure 7:
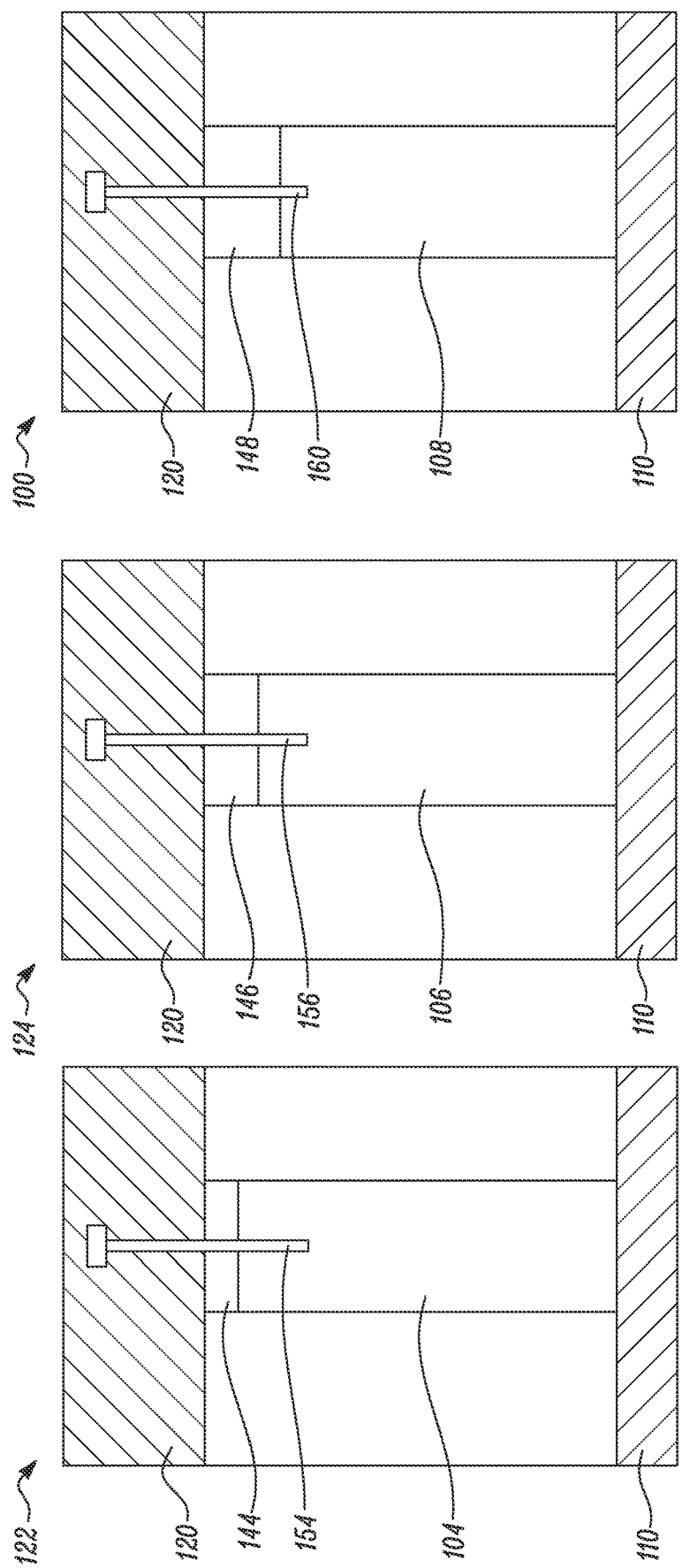
FIGS. 7A and 7B are enlarged schematic sectional side views of an inlet end and an outlet end of an outer cowl, respectively.
FIG. 7C is an enlarged schematic sectional side view of the thermal management system including the outer cowl, the third removable shim, and a heat exchanger.

FIGS. 7A and 7B are enlarged schematic sectional side views of the inlet end 122 and the outlet end 124 of the outer cowl 120, respectively. FIG. 7C is an enlarged schematic sectional side view of the thermal management system 100 including the outer cowl 120, the heat exchanger 108, and the third removable shim 148. Referring to FIG. 7A, the thermal management system 100 (shown in FIG. 3) further includes a plurality of first countersunk bolts 154 corresponding to the plurality of first removable shims 144. In some embodiments, each of the plurality of first countersunk bolts 154 extends through a corresponding first removable shim 144 from the plurality of first removable shims 144 and removably couples the corresponding first removable shim 144 to each of the outer cowl 120 and the corresponding inlet vane 104.

Referring to FIGS. 3 and 7A, only one first countersunk bolt 154 from the plurality of first countersunk bolts 154 is visible. In some embodiments, each of the plurality of first countersunk bolts 154 may allow the corresponding first removable shim 144 to be held in position as well as removed from between the corresponding inlet vane 104 and the outer cowl 120 and replaced with the corresponding first replacement shim 164 (shown in FIGS. 5 and 6) based on updated operational requirements of the gas turbine engine 10. In some embodiments, the plurality of first removable shims 144 may be positioned based a location feature (not shown) provided on the corresponding inlet vane 104 or the outer cowl 120 before removably coupling the corresponding first removable shim 144 to each of the outer cowl 120 and the corresponding inlet vane 104.

Referring to FIG. 7B, the thermal management system 100 (shown in FIG. 3) further includes a plurality of second countersunk bolts 156 corresponding to the plurality of second removable shims 146. In some embodiments, each of the plurality of second countersunk bolts 156 extends through a corresponding second removable shim 146 from the plurality of second removable shims 146 and removably couples the corresponding second removable shim 146 to each of the outer cowl 120 and the corresponding outlet vane 106.

Referring to FIGS. 3 and 7B, only one second countersunk bolt 156 from the plurality of second countersunk bolts 156 is visible. In some embodiments, each of the plurality of second countersunk bolts 156 may allow the corresponding second removable shim 146 to be held in position as well as removed from between the corresponding outlet vane 106 and the outer cowl 120 and replaced with the corresponding second replacement shim 166 (shown in FIGS. 5 and 6) based on updated operational requirements of the gas turbine engine 10. In some embodiments, the plurality of second removable shims 146 may be positioned based a location feature (not shown) provided on the corresponding outlet vane 106 or the outer cowl 120 before removably coupling the corresponding second removable shim 146 to each of the outer cowl 120 and the corresponding outlet vane 106.

Referring to FIG. 7C, the thermal management system 100 further includes one or more third countersunk bolts 160 corresponding to the third removable shim 148. In some embodiments, the one or more third countersunk bolts 160 extends through the third removable shim 148 and removably couples the third removable shim 148 to the heat exchanger 108. In the illustrated embodiment of FIG. 7C, only one third countersunk bolt 160 is shown for the purpose of illustration. In some embodiments, the third countersunk bolt 160 may allow the third removable shim 148 to be held in position as well as removed from between the heat exchanger 108 and the outer cowl 120 and replaced with the third replacement shim 168 (shown in FIGS. 5 and 6).

Figure 8:
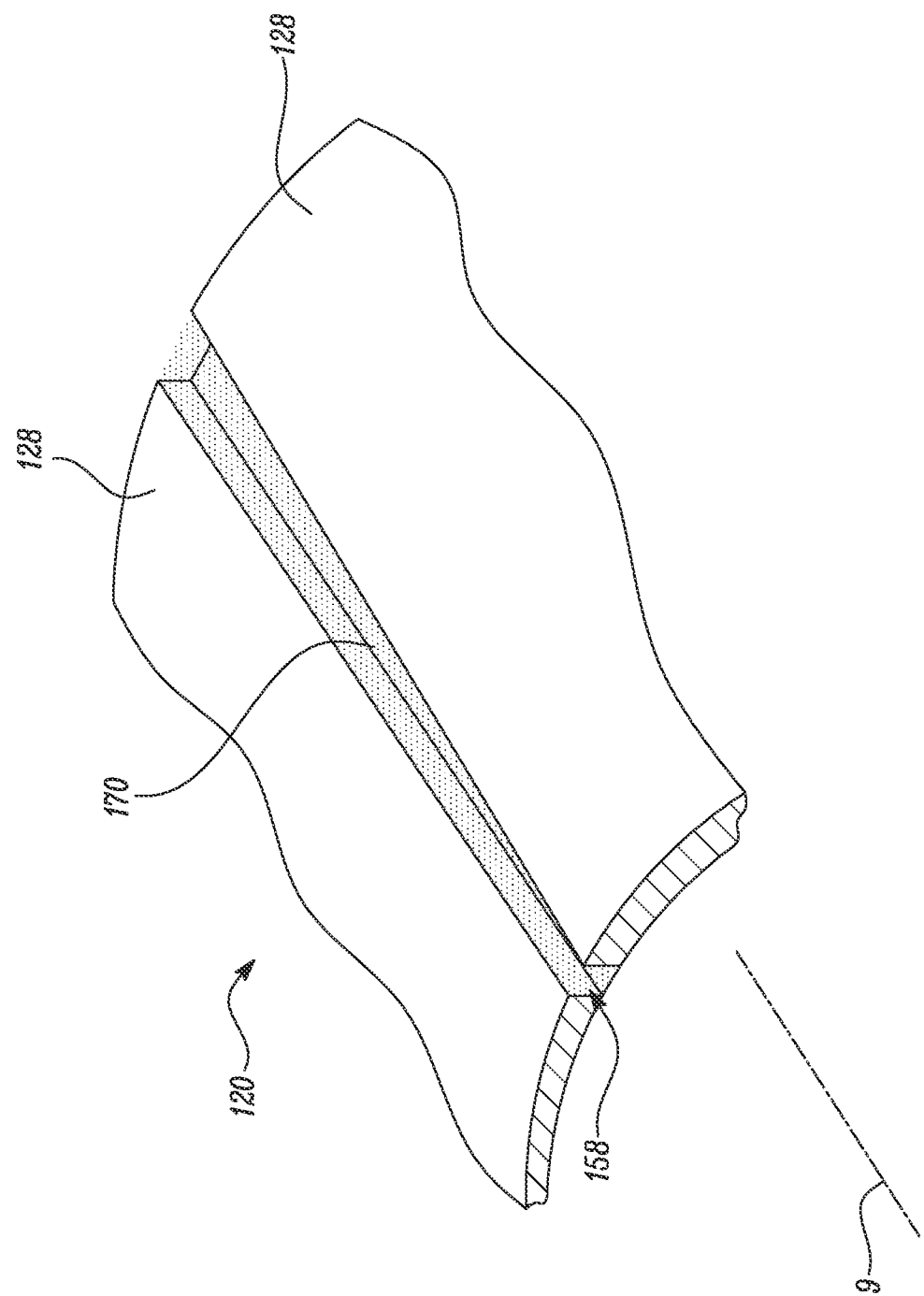
FIG. 8 is a schematic sectional perspective view of a portion of the outer cowl taken along a section line R-R' shown in FIG. 5.

FIG. 8 is a schematic sectional perspective view of a portion of the outer cowl 120 taken along a section line R-R' shown in FIG. 5. In some embodiments, the outer cowl 120 further includes a plurality of panels 128 disposed circumferentially adjacent to each other relative to the principal rotational axis 9. Referring to FIGS. 3, 5 and 8, in some embodiments, a gap 158 exists between the plurality of panels 128 as each of the plurality of first removable shims 144 is replaced with the corresponding first replacement shim 164, each of the plurality of second removable shims 146 is replaced with the corresponding second replacement shim 166, and the third removable shim 148 is replaced with the third replacement shim 168. In other words, the gap 158 may appear between adjacent panels 128 due to radially outward movement of the plurality of panels 128 relative to the principal rotational axis 9 and the increase in the radial distances ID, OD between the inlet end 122 and the outlet end 124, respectively, of the outer cowl 120 and the bypass inner wall 110. In some embodiments, the gap 158 may be reduced by filling the gap 158 with a filler 170. The gap 158 at the inlet end 122 of the outer cowl 120 may require to be closed due to foreign object damage tolerance requirements and aerodynamic considerations while the gap 158 at the outlet end 124 of the outer cowl 120 may be acceptable. The filler 170 may be made of any suitable material based on application requirements.

FIG. 9A is a schematic sectional view of the outer cowl 120 taken along sections lines P-P' or Q-Q' shown in FIG. 3. FIG. 9B is a schematic sectional view of the outer cowl 120 taken along sections lines R-R' or S-S' shown in FIG. 5. FIG. 9C is a schematic sectional view of the outer cowl 120 taken along sections lines T-T' or U-U' shown in FIG. 6. In some embodiments, each panel 128 from the plurality of panels 128 defines a first circumferential edge 138 and a second circumferential edge 142 opposite to the first circumferential edge 138. In the illustrated embodiments of FIGS. 9A-9C, the first circumferential edge 138 of one panel 128 from the plurality of panels 128 and the second circumferential edge 142 of an adjacent panel 128 from the plurality of panels 128 is visible.

In some embodiments, each panel 128 includes a recess 140 (shown in FIGS. 9A and 9B) circumferentially extending partially from the second circumferential edge 142 towards the first circumferential edge 138 of the panel 128. In some embodiments, the outer cowl 120 further includes a plurality of elastic lips 150 corresponding to the plurality of panels 128. In some embodiments, each of the plurality of elastic lips 150 circumferentially extends from the first circumferential edge 138 of a corresponding panel 128 towards the second circumferential edge 142 of the adjacent panel 128 from the plurality of panels 128. In some embodiments, each of the plurality of elastic lips 150 is slidably and at least partially received on the recess 140 of the adjacent panel 128. In some embodiments, each of the plurality of elastic lips 150 may also axially extend along the principal rotational axis 9. In some embodiments, the plurality of elastic lips 150 are coupled to the first circumferential edge 138 of the corresponding panel 128 via any suitable means, e.g., mechanical fasteners (e.g., screws, rivets, bolts, etc.), adhesives, etc. In some embodiments, each of the plurality of elastic lips 150 may be flexibly coupled to the first circumferential edge 138 of the corresponding panel 128.

In some embodiments, the thermal management system 100 further includes a plurality of mechanical attachments 152 corresponding to the plurality of elastic lips 150. In some embodiments, each of the plurality of mechanical attachments 152 couples a corresponding elastic lip 150 from the plurality of elastic lips 150 to the recess 140 of the adjacent panel 128. In the illustrated embodiments of FIGS. 9A-9C, a single mechanical attachment 152 from the plurality of mechanical attachments 152 is schematically shown for the purpose of illustration. In some embodiments, each of the plurality of mechanical attachments 152 may include a mechanical fastener (e.g., a bolt) movable within a slot (not shown) disposed on the recess 140 of the corresponding panel 128. In some embodiments, each of the plurality of mechanical attachments 152 may allow the corresponding elastic lip 150 to move relative to the recess 140 of the adjacent panel 128 while being engaged with the recess 140 of the adjacent panel 128 at all times as the outer cowl 120 is positionally adjusted relative to the bypass inner wall 110 (shown in FIGS. 3-6).

Referring to FIG. 9A, in a base configuration, the plurality panels 128 are arranged such that the gap 158 exists between the first circumferential edge 138 of the panel 128 and the second circumferential edge 142 of the adjacent panel 128. Referring to FIGS. 5 and 9B, as each of the plurality of first removable shims 144 (shown in FIG. 3) is replaced with the corresponding first replacement shim 164, each of the plurality of second removable shims 146 (shown in FIG. 3) is replaced with the corresponding second replacement shim 166, and the third removable shim 148 (shown in FIG. 3) is replaced with the third replacement shim 166, the gap 158 (shown in FIG. 8A) between the first circumferential edge 138 of the panel 128 and the second circumferential edge 142 of the adjacent panel 128 increases since the thickness T4 of each first replacement shim 166 is greater than the thickness T1 (shown in FIG. 3) of each first removable shim 144, the thickness T5 of each second replacement shim 166 is greater than the thickness T2 (shown in FIG. 3) of each second removable shim 146, and the thickness T6 of the third replacement shim 168 is greater than the thickness T3 (shown in FIG. 3) of the third removable shim 148. In other words, the gap 158 (shown in FIG. 9A) between the first circumferential edge 138 of the panel 128 and the second circumferential edge 142 of the adjacent panel 128 increases due to radially outward movement of the plurality of panels 128 of the outer cowl 120 relative to the bypass inner wall 110.

The plurality of elastic lips 150 may accommodate the increase in the gap 158 (shown in FIG. 9A) due to the radially outward movement of the plurality of panels 128. Thus, the plurality of elastic lips 150 may ensure a continuous smooth surface in the circumferential direction C (also shown in FIGS. 3-6), thereby allowing conformance at various circumferential locations of the outer cowl 120. Therefore, any mismatch between the plurality of panels 128 due to the movement of the outer cowl 120 may be mitigated. Further, the plurality of elastic lips 150 may minimize a fluid leakage from within the outer cowl 120 to the main bypass duct 22 to an acceptable level.

Referring to FIGS. 6 and 9C, as each of the plurality of first removable shims 144 (shown in FIG. 3) is replaced with the corresponding first replacement shim 164, each of the plurality of second removable shims 146 (shown in FIG. 3) is replaced with the corresponding second replacement shim 166, and the third removable shim 148 (shown in FIG. 3) is replaced with the third replacement shim 166, the gap 158 (shown in FIG. 9A) between the first circumferential edge 138 of the panel 128 and the second circumferential edge 142 of the adjacent panel 128 decreases since the thickness T4 of each first replacement shim 166 is lesser than the thickness T1 (shown in FIG. 3) of each first removable shim 144, the thickness T5 of each second replacement shim 166 is lesser than the thickness T2 (shown in FIG. 3) of each second removable shim 146, and the thickness T6 of the third replacement shim 168 is lesser than the thickness T3 (shown in FIG. 3) of the third removable shim 148. In other words, the gap 158 (shown in FIG. 9A) between the first circumferential edge 138 of the panel 128 and the second circumferential edge 142 of the adjacent panel 128 decreases due to radially inward movement of the plurality of panels 128 of the outer cowl 120 relative to the bypass inner wall 110.

A curvature of the plurality panels 128 may be designed such that each of the plurality of recesses 140 may completely receive the elastic lip 150 of the adjacent panel 128 as each of the plurality of panels 128 move radially inwards relative to the principal rotational axis 9. In such a configuration, the gap 158 (see FIG. 8A) between the first circumferential edge 138 of the panel 128 and the second circumferential edge 142 of the adjacent panel 128 may cease to exist.

In some embodiments, each of the plurality of elastic lips 150 may be thin enough and may include an appropriate elastic modulus such that each of the plurality of elastic lips 150 deflects when the plurality of panels 128 move radially inward or outward. Suitable materials (e.g., thermoplastic) may be chosen for the plurality of elastic lips 150 based on application requirements. In some embodiments, each of the plurality of elastic lips 150 may be manufactured by injecting different materials (with varying elastic properties) in a same mould. In some embodiments, each of the plurality of elastic lips 150 may include various layers of material with differing elastic properties.

Figure 10:
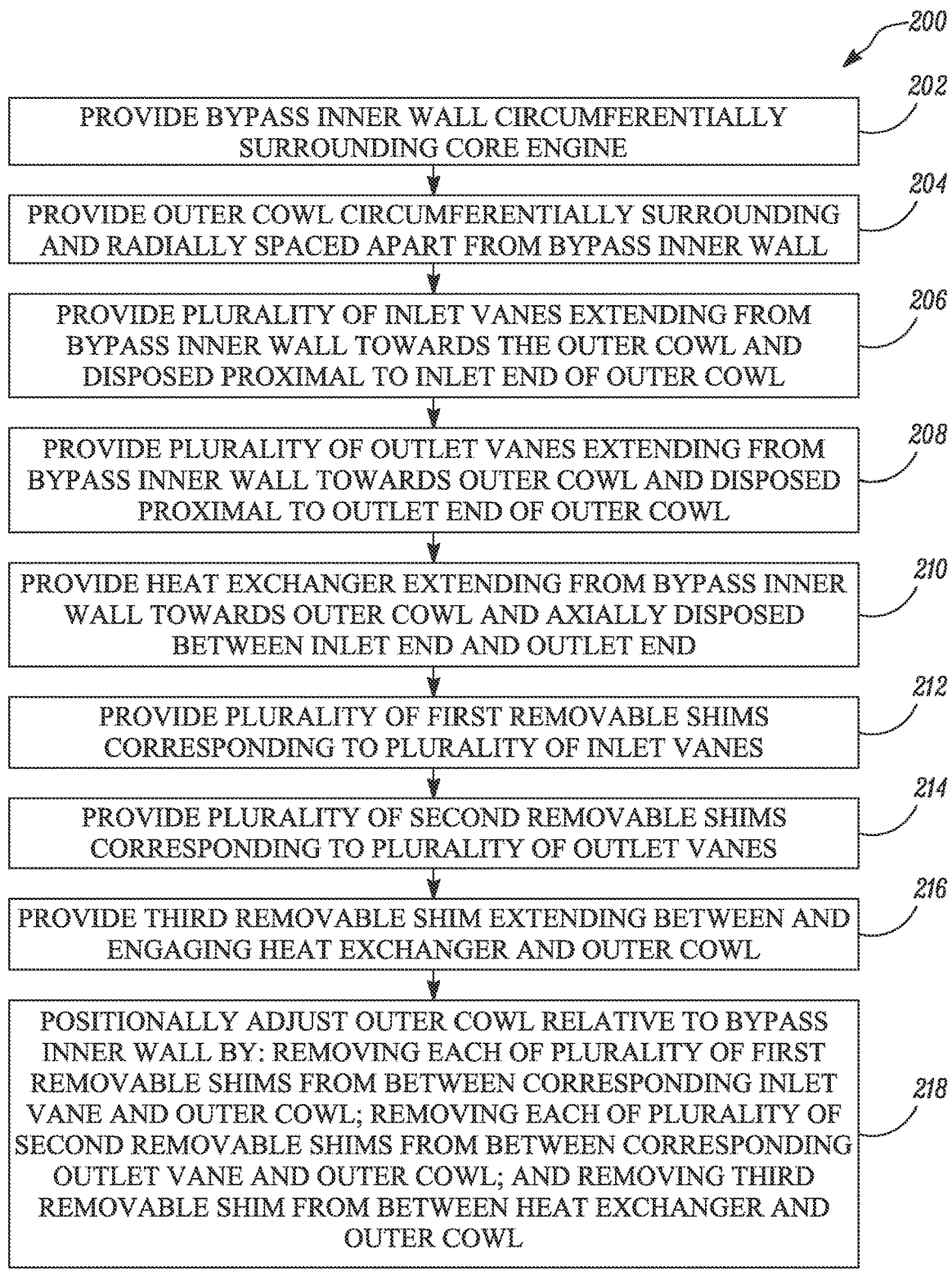
FIG. 10 is a flow chart illustrating a method for thermal management of the gas turbine engine.

FIG. 10 is a flow chart illustrating a method 200 for thermal management of the gas turbine engine 10 having the principal rotational axis 9, the engine core 11, and the nacelle 21. The method 200 will be described hereinafter with reference to the gas turbine engine 10 of FIGS. 1-6 and the thermal management system 100 of FIGS. 3-6.

At step 202, the method 200 includes providing the bypass inner wall 110 circumferentially surrounding the engine core 11 around the principal rotational axis 9 and extending along the principal rotational axis 9. The bypass inner wall 110 is radially disposed between the engine core 11 and the nacelle 21 relative to the principal rotational axis 9, such that the main bypass duct 22 is defined between the bypass inner wall 110 and the nacelle 21. At step 204, the method 200 further includes providing the outer cowl 120 circumferentially surrounding and radially spaced apart from the bypass inner wall 110 relative to the principal rotational axis 9. The outer cowl 120 extends along the principal rotational axis 9 between the inlet end 122 and the outlet end 124. The outer cowl 120 is disposed within the main bypass duct 22.

At step 206, the method 200 further includes providing the plurality of inlet vanes 104 extending from the bypass inner wall 110 towards the outer cowl 120 and disposed proximal to the inlet end 122 of the outer cowl 120. The plurality of inlet vanes 104 are circumferentially spaced apart from each other relative to the principal rotational axis 9. At step 208, the method 200 further includes providing the plurality of outlet vanes 106 extending from the bypass inner wall 110 towards the outer cowl 120 and disposed proximal to the outlet end 124 of the outer cowl 120.

The plurality of outlet vanes 106 are circumferentially spaced apart from each other relative to the principal rotational axis 9. At step 210, the method 200 further includes providing the heat exchanger 108 extending from the bypass inner wall 110 towards the outer cowl 120 and axially disposed between the inlet end 122 and the outlet end 124 relative to the principal rotational axis.

At step 212, the method 200 further includes providing the plurality of first removable shims 144 corresponding to the plurality of inlet vanes 104. Each first removable shim 144 extends between and engages the outer cowl 120 and the corresponding inlet vane 104 from the plurality of inlet vanes 104. At step 214, the method 200 further includes providing the plurality of second removable shims 146 corresponding to the plurality of outlet vanes 106. Each second removable shim 146 extends between and engages the outer cowl 120 and the corresponding outlet vane 106 from the plurality of outlet vanes 106. At step 216, the method 200 further includes providing the third removable shim 148 extending between and engaging the heat exchanger 108 and the outer cowl 120. The third removable shim 148 circumferentially extends around the principal rotational axis 9.

At step 218, the method 200 further includes positionally adjusting the outer cowl 120 relative to the bypass inner wall 110 by: removing each of the plurality of first removable shims 144 from between the corresponding inlet vane 104 and the outer cowl 120; removing each of the plurality of second removable shims 146 from between the corresponding outlet vane 106 and the outer cowl 120; and removing the third removable shim 148 from between the heat exchanger 108 and the outer cowl 120.

In some embodiments, the method 200 further includes providing the plurality of first replacement shims 164 corresponding to the plurality of first removable shims 144. In some embodiments, each of the plurality of first replacement shims 164 includes the thickness T4 different from the thickness T1 of each of the plurality of first removable shims 144. In some embodiments, the method 200 further includes removably disposing each of the plurality of first replacement shims 164 between the outer cowl 120 and the corresponding inlet vane 104 after removal of the corresponding first removable shim 144, such that each of the plurality of first replacement shims 164 engages each of the outer cowl 120 and the corresponding inlet vane 104.

In some embodiments, the method 200 further includes providing the plurality of second replacement shims 166 corresponding to the plurality of second removable shims 146. In some embodiments, each of the plurality second replacement shims 166 includes the thickness T5 different from the thickness T2 of each of the plurality of second removable shims 146. In some embodiments, the method 200 further includes removably disposing each of the plurality of second replacement shims 166 between the outer cowl 120 and the corresponding outlet vane 106 after removal of the corresponding second removable shim 146, such that each of the plurality of second replacement shims 166 engages each of the outer cowl 120 and the corresponding outlet vane 106.

In some embodiments, the method 200 further includes removably disposing the third replacement shim 168 between the heat exchanger 108 and the outer cowl 120 after removal of the third removable shim 148, such that the third replacement shim 168 engages each of the heat exchanger 108 and the outer cowl 120.

It should be understood that the thermal management system as described with reference to the FIGS. 3-6 may also be applicable to other auxiliary systems utilized with the gas turbine engine 10. For example, the inlet end 122 and the outlet end 124 may be form a turbine case cooling inlet and an engine bleed outlet, respectively. Further, the proposed solution is also applicable to other heat exchanger systems, and not only to gas turbine engines. Additionally, the proposed solution may also be applicable to other continuous flow machines that encompass a continuous flow heat exchanger for the purposes of heat dissipation.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

We claim:

1. A thermal management system for a gas turbine engine having a principal rotational axis, an engine core, and a nacelle, the thermal management system comprising:
    a bypass inner wall circumferentially surrounding the engine core around the principal rotational axis and extending along the principal rotational axis, wherein the bypass inner wall is radially disposed between the engine core and the nacelle relative to the principal rotational axis, such that a main bypass duct is defined between the bypass inner wall and the nacelle;
    an outer cowl circumferentially surrounding and radially spaced apart from the bypass inner wall relative to the principal rotational axis, wherein the outer cowl extends along the principal rotational axis between an inlet end and an outlet end, and wherein the outer cowl is disposed within the main bypass duct;
    a plurality of inlet vanes extending from the bypass inner wall towards the outer cowl and disposed proximal to the inlet end of the outer cowl, wherein the plurality of inlet vanes are circumferentially spaced apart from each other relative to the principal rotational axis;
    a plurality of outlet vanes extending from the bypass inner wall towards the outer cowl and disposed proximal to the outlet end of the outer cowl, wherein the plurality of outlet vanes are circumferentially spaced apart from each other relative to the principal rotational axis;
    a heat exchanger extending from the bypass inner wall towards the outer cowl and axially disposed between the inlet end and the outlet end relative to the principal rotational axis;
    a plurality of first removable shims corresponding to the plurality of inlet vanes, wherein each first removable shim from the plurality of first removable shims extends between and engages the outer cowl and a corresponding inlet vane from the plurality of inlet vanes;
    a plurality of second removable shims corresponding to the plurality of outlet vanes, wherein each second removable shim from the plurality of second removable shims extends between and engages the outer cowl and a corresponding outlet vane from the plurality of outlet vanes; and
    a third removable shim extending between and engaging the heat exchanger and the outer cowl, the third removable shim circumferentially extending around the principal rotational axis;
    wherein, for positionally adjusting the outer cowl relative to the bypass inner wall:
        each of the plurality of first removable shims is removable from between the corresponding inlet vane and the outer cowl;
        each of the plurality of second removable shims is removable from between the corresponding outlet vane and the outer cowl; and
        the third removable shim is removable from between the heat exchanger and the outer cowl.

2. The thermal management system of claim 1, wherein the bypass inner wall comprises:
    a first bypass surface facing the outer cowl and substantially parallel to the principal rotational axis;
    a second bypass surface extending from the first bypass surface and inclined obliquely relative to the principal rotational axis away from the outer cowl;
    a third bypass surface extending from and inclined obliquely to the second bypass surface, wherein the third bypass surface is further inclined obliquely relative to the principal rotational axis towards the outer cowl; and
    a fourth bypass surface extending from the third bypass surface and substantially parallel to the principal rotational axis.

3. The thermal management system of claim 2, wherein the outer cowl comprises:
    a first cowl surface facing the bypass inner wall and substantially parallel to the principal rotational axis;
    a second cowl surface facing the bypass inner wall and substantially parallel to the principal rotational axis, wherein the second cowl surface is axially and radially spaced apart from the first cowl surface relative to the principal rotational axis; and
    a third cowl surface extending between the first cowl surface and the second cowl surface, wherein the third cowl surface is inclined obliquely relative to the principal rotational axis and substantially parallel to the third bypass surface of the bypass inner wall;
    wherein the heat exchanger extends between the third cowl surface and the third bypass surface.

4. The thermal management system of claim 1, wherein the outer cowl further comprises:
    a plurality of panels disposed circumferentially adjacent to each other relative to the principal rotational axis, wherein each panel from the plurality of panels defines a first circumferential edge and a second circumferential edge opposite to the first circumferential edge, and wherein each panel comprises a recess circumferentially extending partially from the second circumferential edge towards the first circumferential edge; and a plurality of elastic lips corresponding to the plurality of panels, wherein each of the plurality of elastic lips circumferentially extends from the first circumferential edge of a corresponding panel towards the second circumferential edge of an adjacent panel from the plurality of panels, and wherein each of the plurality of elastic lips is slidably and at least partially received on the recess of the adjacent panel.

5. The thermal management system of claim 4, further comprising a plurality of mechanical attachments corresponding to the plurality of elastic lips, wherein each of the plurality of mechanical attachments couples a corresponding elastic lip from the plurality of elastic lips to the recess of the adjacent panel.

6. The thermal management system of claim 1, further comprising a plurality of first countersunk bolts corresponding to the plurality of first removable shims, wherein each of the plurality of first countersunk bolts extends through a corresponding first removable shim from the plurality of first removable shims and removably couples the corresponding first removable shim to each of the outer cowl and the corresponding inlet vane.

7. The thermal management system of claim 1, further comprising a plurality of second countersunk bolts corresponding to the plurality of second removable shims, wherein each of the plurality of second countersunk bolts extends through a corresponding second removable shim from the plurality of second removable shims and removably couples the corresponding second removable shim to each of the outer cowl and the corresponding outlet vane.

8. The thermal management system of claim 1, further comprising a plurality of first replacement shims corresponding to the plurality of first removable shims, wherein each of the plurality of first replacement shims is removably disposed between and engages the outer cowl and the corresponding inlet vane after removal of the corresponding first removable shim.

9. The thermal management system of claim 8, wherein each of the plurality of first replacement shims comprises a thickness different from a thickness of each of the plurality of first removable shims.

10. The thermal management system of claim 1, further comprising a plurality of second replacement shims corresponding to the plurality of second removable shims, wherein each of the plurality of second replacement shims is removably disposed between and engages the outer cowl and the corresponding outlet vane after removal of the corresponding second removable shim.

11. The thermal management system of claim 10, wherein each of the plurality of second replacement shims comprises a thickness different from a thickness of each of the plurality of second removable shims.

12. The thermal management system of claim 1, further comprising a third replacement shim, wherein the third replacement shim is removably disposed between and engages the heat exchanger and the outer cowl after removal of the third removable shim.

13. The gas turbine engine comprising:
the principal rotational axis;
the engine core extending along the principal rotational axis;
the nacelle circumferentially surrounding the engine core around the principal rotational axis; and
the thermal management system of claim 1, wherein the bypass inner wall circumferentially surrounds the engine core around the principal rotational axis and extends along the principal rotational axis, and wherein the bypass inner wall is radially disposed between the engine core and the nacelle relative to the principal rotational axis, such that the main bypass duct is defined between the bypass inner wall and the nacelle.

14. A method for thermal management of a gas turbine engine having a principal rotational axis, an engine core, and a nacelle, the method comprising the steps of:
providing a bypass inner wall circumferentially surrounding the engine core around the principal rotational axis and extending along the principal rotational axis, wherein the bypass inner wall is radially disposed between the engine core and the nacelle relative to the principal rotational axis, such that a main bypass duct is defined between the bypass inner wall and the nacelle;
providing an outer cowl circumferentially surrounding and radially spaced apart from the bypass inner wall relative to the principal rotational axis, wherein the outer cowl extends along the principal rotational axis between an inlet end and an outlet end, and wherein the outer cowl is disposed within the main bypass duct;
providing a plurality of inlet vanes extending from the bypass inner wall towards the outer cowl and disposed proximal to the inlet end of the outer cowl, wherein the plurality of inlet vanes are circumferentially spaced apart from each other relative to the principal rotational axis;
providing a plurality of outlet vanes extending from the bypass inner wall towards the outer cowl and disposed proximal to the outlet end of the outer cowl, wherein the plurality of outlet vanes are circumferentially spaced apart from each other relative to the principal rotational axis;
providing a heat exchanger extending from the bypass inner wall towards the outer cowl and axially disposed between the inlet end and the outlet end relative to the principal rotational axis;
providing a plurality of first removable shims corresponding to the plurality of inlet vanes, wherein each first removable shim extends between and engages the outer cowl and a corresponding inlet vane from the plurality of inlet vanes;
providing a plurality of second removable shims corresponding to the plurality of outlet vanes, wherein each second removable shim extends between and engages the outer cowl and a corresponding outlet vane from the plurality of outlet vanes;
providing a third removable shim extending between and engaging the heat exchanger and the outer cowl, the third removable shim circumferentially extending around the principal rotational axis;
positionally adjusting the outer cowl relative to the bypass inner wall by:
removing each of the plurality of first removable shims from between the corresponding inlet vane and the outer cowl;
removing each of the plurality of second removable shims from between the corresponding outlet vane and the outer cowl; and
removing the third removable shim from between the heat exchanger and the outer cowl.

15. The method of claim 14, further comprising:
providing a plurality of first replacement shims corresponding to the plurality of first removable shims, wherein each of the plurality of first replacement shims comprises a thickness different from a thickness of each of the plurality of first removable shims; and
removably disposing each of the plurality of first replacement shims between the outer cowl and the corresponding inlet vane after removal of the corresponding first removable shim, such that each of the plurality of first replacement shims engages each of the outer cowl and the corresponding inlet vane.

16. The method of claim 14, further comprising:
providing a plurality of second replacement shims corresponding to the plurality of second removable shims, wherein each of the plurality of second replacement shims comprises a thickness different from a thickness of each of the plurality of second removable shims; and
removably disposing each of the plurality of second replacement shims between the outer cowl and the corresponding outlet vane after removal of the corresponding second removable shim, such that each of the plurality of second replacement shims engages each of the outer cowl and the corresponding outlet vane.

17. The method of claim 14, further comprising removably disposing a third replacement shim between the heat exchanger and the outer cowl after removal of the third removable shim, such that the third replacement shim engages each of the heat exchanger and the outer cowl.

* * * * *